United States Patent
Kapit

(10) Patent No.: US 12,373,723 B2
(45) Date of Patent: Jul. 29, 2025

(54) SYSTEMS AND METHODS FOR ACCELERATED QUANTUM OPTIMIZATION

(71) Applicant: COLORADO SCHOOL OF MINES, Golden, CO (US)

(72) Inventor: Eliot Kapit, Golden, CO (US)

(73) Assignee: Colorado School of Mines, Golden, CO (US)

( * ) Notice: Subject to any disclaimer, the term of this patent is extended or adjusted under 35 U.S.C. 154(b) by 1279 days.

(21) Appl. No.: 17/027,146

(22) Filed: Sep. 21, 2020

(65) Prior Publication Data

US 2021/0089954 A1  Mar. 25, 2021

Related U.S. Application Data

(60) Provisional application No. 62/903,426, filed on Sep. 20, 2019.

(51) Int. Cl.
*G06N 10/60* (2022.01)
*G06N 10/40* (2022.01)
*G06N 20/00* (2019.01)

(52) U.S. Cl.
CPC ............. *G06N 10/60* (2022.01); *G06N 10/40* (2022.01); *G06N 20/00* (2019.01)

(58) Field of Classification Search
CPC ........ G06N 10/00; G06N 20/00; G06N 10/40; G06N 10/60; G06N 10/80
See application file for complete search history.

(56) References Cited

U.S. PATENT DOCUMENTS

| | | | | |
|---|---|---|---|---|
| 2008/0313114 | A1* | 12/2008 | Rose | B82Y 10/00 712/E9.001 |
| 2012/0023053 | A1* | 1/2012 | Harris | G06N 10/40 706/45 |

(Continued)

FOREIGN PATENT DOCUMENTS

WO   2019084286 A1   5/2019

OTHER PUBLICATIONS

Hen et al., "Quantum Annealing for Constrained Optimization," Physical Review Applied 5, 034007 (2016) (Year: 2016).*

(Continued)

*Primary Examiner* — Miranda M Huang
*Assistant Examiner* — Yao David Huang
(74) *Attorney, Agent, or Firm* — Dorsey & Whitney LLP

(57) ABSTRACT

Example methods for quantum optimization include applying an optimization algorithm to a problem Hamiltonian (defined by qubit interaction constraint coefficients based on a binary optimization problem to find a local minimum state with initial total energy). The method further includes selecting a target energy that is less than the initial energy based on the binary optimization problem, modifying a subset of the qubit interaction constraint coefficient of the interaction constraint coefficients by a selected amount to reduce a total energy of the local minimum state to approximate the target total energy to provide an updated problem Hamiltonian, evolving a many-body quantum system (MBQS) based on the updated problem Hamiltonian by applying oscillating fields to single qubit transverse field terms and/or to transverse inter-qubit couplings of the MBQS for a time period, determining the total energy relative to the problem Hamiltonian based on the MBQS after expiration of the time period.

19 Claims, 10 Drawing Sheets

(56) References Cited

U.S. PATENT DOCUMENTS

| | | | |
|---|---|---|---|
| 2018/0218279 A1* | 8/2018 | Lechner | G06N 10/60 |
| 2019/0266508 A1* | 8/2019 | Bunyk | G06N 10/70 |
| 2021/0166148 A1* | 6/2021 | Matsuura | G06N 10/20 |
| 2022/0292235 A1* | 9/2022 | Susa | G06F 17/11 |
| 2024/0013088 A1 | 1/2024 | Kapit et al. | |

OTHER PUBLICATIONS

Kapit, Eliot, "Improved quantum annealer performance from oscillating transverse fields," arXiv: 1710.11056v1 [quant-ph] Oct. 30, 2017 (Year: 2017).*

Lucas, Andrew, "Hard combinatorial problems and minor embeddings on lattice graphs," arXiv: 1812.01789v1 [quant-ph] Dec. 5, 2018 (Year: 2018).*

Pastorello et al., "Learning adiabatic quantum algorithms for solving optimization problems," arXiv:1909.06870v1 [quant-ph] Sep. 15, 2019 (Year: 2019).*

Leghtas et al., "Hardware-Efficient Autonomous Quantum Memory Protection", Phys. Rev. Lett. 111, 120501 (2013), 120501-1-120501-5.

Leghtas et al. "Confining the State of Light to a Quantum Manifold by Engineered Two-Photon Loss", Science 347, 6224, arZiv:1412.4633v1 (2014), 32 pgs.

Lescanne et al., "Exponential Suppression of Bit-Flips in a Qubit Encoded in a Oscillator", Nature Physics 16, 509, arXiv:1907.11729v1 (2019), 18 pgs.

Malekakhlagh et al., "First-Principles Analysis of Cross-Resonance Gate Operation", Physical Review A 102, 042605 (2020), 30 pgs.

Marwaha et al., "Bounds on Approximating Max kXOR with Quantum and Classical Local Algorithms", Quantum 6, 757 (2022), 25 pgs.

McClean et al. "The Theory of Variational Hybrid Quantum-Classical Algorithms", New Journal of Physics 18, 023023, arXiv:1509.04279v1 (2015), 20 pgs.

McKay et al., "A Universal Gate for Fixed-Frequency Qubits via a Tunable Bus", arXiv:1604.03076 (2016), 10 pgs.

Mézard et al., "Analytic and Algorithmic Solution of Random Satisfiability Problems", Science 297, 812 (2002), pp. 812-815.

Mézard et al., "Clustering of Solutions in the Random Satisfiability Problem", Physical Review Letters 94, 197205 (2005), 4 pgs.

Michael et al., "New Class of Quantum Error-Correcting Codes for a Bosonic Mode", Phys. Rev. X 6, 031006 (2016), 25 pgs.

Mirrahimi et al., "Dynamically Protected Cat-Qubits: A New Paradigm for Universal Quantum Computation", New J. Phys. 16, 045014, arXiv:1312.2017v1 (2013), 28 pgs.

Montanari, "Optimization of the Sherrington-Kirkpatrick Hamiltonian", SIAM Journal on Computing pp. FOCS19-1 (2021), 38 pgs.

Amin et al., "Quantum Error Mitigation in Quantum Annealing", arXiv:2311.01306v1 [quant-ph] (2023), 10 pgs.

Mossi et al., "Embedding Quantum Optimization Problems using AC Driven Quantum Ferromagnets", arXiv preprint arXiv:2306.10632 (2023), 22 pgs.

Motzoi et al., "Simple Pulses for Elimination of Leakage in Weakly Nonlinear Qubits", Phys. Rev. Lett. 103, 110501 (2009), 10.1103/Phys-RevLett. 103.110501, pp. 110501-1-110501-4.

Mourik et al., "Signatures of Majorana Fermions in Hybrid Superconductor-Semiconductor Nanowire Devices", Science 336, 1003 (2012), 28 pgs.

Neill et al., "A Blueprint for Demonstrating Quantum Supremacy with Superconducting Qubits", arXiv preprint arXiv:1709.06678 (2017), 22 pgs.

Nguyen et al., "Quantum Optimization with Arbitrary Connectivity using Rydberg Atom Arrays", PRX Quantum 4, 010316 (2023), 19 pgs.

Ofek et al., "Demonstrating Quantum Error Correction that Extends the Lifetime of Quantum Information", Nature 536, 441 (2016), 10.1038/nature18949, 44 pgs.

Pal et al., "The Many-Body Localization Phase Transition", Physical review b 82, 174411 (2010), 5 pgs.

Parisi, Infinite Number of Order Parameters for Spin-Glasses, Physical Review Letters 43, 1754 (1979), 3 pgs.

Perez et al., "Error-Divisible Two-Qubit Gates", arXiv preprint arXiv:2110.11537 (2021), 11 pgs.

Peruzzo et al., "A Variational Eigenvalue Solver on a Quantum Processor", Nature communications 5, 4213, arXiv:1304.3061v1 (2013), 10 pgs.

Pietracaprina et al., "Forward Approximation as a mean-field approximation for the Anderson and Many-Body Localization Transitions", Physical Review B 93, 054201 (2016), pp. 054201-1-054201-15.

Prada et al., "From Andreev to Majorana Bound States in Hybrid Superconductor-Semiconductor Nanowires", Nature Reviews Physics 2, 575 (2020), 23 pgs.

Reagor et al., "Quantum Memory with Millisecond Coherence in Circuit QED", Phys. Rev. B 94, 014506 (2016), pp. 014506-1-014506-8.

Roland et al., "Quantum Search by Local Adiabatic Evolution", Phys. Rev. A 65, 042308 (2002), pp. 042308-1-042308-6.

Santagati et al., "Witnessing Eigenstates for Quantum Simulation of Hamiltonian Spectra", Science advances 4, eaap9646 (2018), 27 pgs.

Scardicchio et al., "Perturbation Theory Approaches to Anderson and Many-Body Localization: Some Lecture Notes", arXiv preprint arXiv:1710.01234 (2017), 41 pgs.

Sels et al., "Minimizing Irreversible Losses in Quantum Systems by Local Counterdiabatic Driving", Proceedings of the National Academy of Sciences 114, E3909 (2017), 8 pgs.

Serbyn et al., "Thouless Energy and Multifractality Across the Many-Body Localization Transition", Physical Review B 96, 104201 (2017), 104201-1-104201-12.

Shaydulin et al., "Evidence of Scaling Advantage for the Quantum Approximate Optimization Algorithm on a Classically Intractable Problem", arXiv preprint arXiv:2308.02342, arXiv:2308.02342v2 (2024), 33 pgs.

Smelyanskiy et al., "Intermittency of Dynamical Phases in a Quantum Spin Glass", arXiv preprint arXiv:1907.01609 (2019), 16 pgs.

Smelyanskiy et al., "Non-Ergodic Delocalized States for Efficient Population Transfer within a Narrow Band of the Energy Landscape", arXiv preprint arXiv: 1802.09542 (2018), 48 pgs.

Somoroff et al., "Millisecond Coherence in a Superconducting Qubit", arXiv preprint arXiv:2103.08578 (2021), 14 pgs.

Srinivasan et al., "Tunable Coupling in Circuit Quantum Electrodynamics Using a Superconducting Charge Qubit with a V-Shaped Energy Level Diagram", Phys. Rev. Lett. 106, 083601 (2011), pp. 083601-1-083601-4.

Stanescu et al., "Majorana Fermions in Semiconductor Nanowires: Fundamentals, Modeling, and Experiment", Journal of Physics: Condensed Matter 25, 233201 (2013), 32 pgs.

Sung et al., "Realization of High-Fidelity CZ and ZZ-free iSWAP Gates with a Tunable Coupler", arXiv:2011.01261 quant-ph] (2021), 34 pgs.

Susa et al., "Quantum Annealing of the p. spin Model under Inhomogeneous Transverse Field Driving", Phys. Rev. A 98, 042326 (2018), URL https://link.aps.org/doi/10.1103/PhysRevA.98.042326, pp. 042326-1-042326-13.

Suzuki et al., "Qulacs: A Fast and Versatile Quantum Circuit Simulator for Research Purpose", Quantum 5, 559 (2021), 34 pgs.

Tang et al., "Unconventional Quantum Annealing Methods for Difficult Trial Problems", Physical Review A 103, 032612 (2021), 032612-1-032612-12.

Tazi et al., "Folded Spectrum VQE: A Quantum Computing Method for the Calculation of Molecular Excited States", arXiv preprint arXiv:2305.04783v2 (2024), 17 pgs.

Terhal, "Quantum Error Correction for Quantum Memories", Rev. Mod. Phys. 87, 307 (2015), 10.1103/RevModPhys.87.307, pp. 307-346.

Tilly et al., "The Variational Quantum Eigensolver: A Review of Methods and Best Practices", Physics Reports 986, 1 (2022), 156 pgs.

(56) References Cited

OTHER PUBLICATIONS

Touzard et al., "Coherent Oscillations Inside a Quantum Manifold Stabilized by Dissipation", Physical Review X 8, 021005 (2018), pp. 021005-1-021005-7.
Venturelli et al., "Quantum Optimization of Fully Connected Spin Glasses", Physical Review X 5, 031040 (2015), pp. 031040-1-031040-8.
Vy et al., "Error-Transparent Evolution: The Ability of Multi-Body Interactions to Bypass Decoherence", New Journal of Physics 15, 053002 (2013), 14 pgs.
Weiss et al., "Spectrum and Coherence Properties of the Current-Mirror Qubit", Physical Review B 100, 224507 (2019), pp. 224507-1-224507-17.
Xiong et al., "Arbitrary Controlled-Phase Gate on Fluxonium Qubits Using Differential ac Stark Shifts", Physical Review Research 4, 023040 (2022), pp. 023040-1-023040-16.
Yan et al., "Rotating-Frame Relaxation as a Noise Spectrum Analyzer of a Superconducting Qubit Undergoing Driven Evolution", Nature Communications 4, 2337, arXiv:1508.06436v1 (2015), 31 pgs.
Farhi et al., "Unstructured Randomness, Small Gaps and Localization", arXiv preprint arXiv:1010.0009 (2010), 17 pgs.
Farhi et al. "The Quantum Approximate Optimization Algorithm and the Sherrington-Kirkpatrick Model at Infinite Size", Quantum 6, 759 (2022), 32 pgs.
Farhi et al "Quantum Computation by Adiabatic Evolution", arXiv:quant-ph/0001106 (2000), 24 pgs.
Finnila et al., "Quantum Annealing: A New Method for Minimizing Multidimensional Functions", Chemical physics letters 219, 343 (1994), 9 pgs.
Flensberg et al., "Engineered Platforms for Topological Superconductivity and Majorana Zero Modes", Nature Reviews Materials 6, 944 (2021), 17 pgs.
Foxen et al., "Demonstrating a Continuous Set of Two-Qubit Gates for Near-Term Quantum Algorithms", arXiv preprint arXiv:2001.08343 (2020), 20 pgs.
Fowler et al. "Surface Codes: Towards Practical Large-Scale Quantum Computation", Phys. Rev. A 86, 032324 (2012), 10.1103/PhysRevA.86.032324, pp. 032324-1-032324-48.
Garey et al., "Some Simplified NP-Complete Problems", Proceedings of the sixth annual ACM symposium on Theory of computing (1974), pp. 47-63.
Geller et al., "Tunable Coupler for Superconducting Xmon Qubits: Perturbative Nonlinear Modeal", arXiv: 1405.1915 (2014), 10 pgs.
Gilyén et al, "(Sub) Exponential Advantage of Adiabatic Quantum Computation with No Sign Problem", Proceedings of the 53rd Annual ACM SIGACT Symposium on Theory of Computing (2021), pp. 1357-1369.
Granet et al., "Benchmarking a Heuristic Floquet Adiabatic Algorithm for the Max-Cut Problem", arXiv preprint arXiv:2404.16001 (2024), 6 pgs.
Graß, "Quantum Annealing with Longitudinal Bias Fields", Phys. Rev. Lett. 123, 120501 (2019), URL https://link.aps.org/doi/10.1103/PhysRevLett.123.120501, 120501-1-120501-6.
Grattan et al., "Exponential Acceleration of Macroscopic Quantum Tunneling in a Floquet Ising Model", arXiv:2311.17814v3 (2024), 2311.17814, 13 pgs.
Grest et al, "Cooling-Rate Dependence for the Spin-Glass Ground-State Energy: Implications for Optimization by Simulated Annealing", Physical Review Letters 56, 1148 (1986), 4 pgs.
Groszkowski et al., Coherence properties of the 0-π qubit, New Journal of Physics 20, 043053 (2018), 21 pgs.
Grover et al. "Fast, Lifetime-Preserving Readout for High-Coherence Quantum Annealers", PRX Quantum 1, 020314 (2020), 020314-1-020314-13.
Gul et al, "Ballistic Majorana Nanowire Devices", Nature nanotechnology 13, 192, zrZiv:1603.04069v3 (2021), 19 pgs.
Gyenis et al, "Moving Beyond the Transmon: Noise-Protected Superconducting Quantum Circuits", PRX Quantum 2, 030101 (2021), 16 pgs.

Gyenis et al., "Experimental Realization of an Intrinsically Error-Protected Superconducting Qubit", arXiv preprint arXiv:1910.07542 (2019), 31 pgs.
Harris et al. "Sign- and Magnitude-Tunable Coupler for Superconducting Flux Qubits", Phys. Rev. Lett. 98, 177001 (2007), 177001-1-177001-4.
Hartmann et al., Phase Transitions in Combinatorial Optimization Problems: Basics, Algorithms and Statistical Mechanics (John Wiley & Sons, 2006), 45 pgs.
Hastad et al., On the Advantage over a Random Assignment, Proceedings of the thirty-fourth annual ACM symposium on Theory of computing (2002), pp. 43-52.
Håstad, "Some Optimal Inapproximability Results", Journal of the ACM (JACM) 48, 798 (2001), pp. 798-859.
Hastings "A Short Path Quantum Algorithm for Exact Optimization", Quantum 2, 78 (2018), 22 pgs.
Hastings "The Power of Adiabatic Quantum Computation with No Sign Problem", Quantum 5, 597 (2021), 24 pgs.
Hauke et al. "Perspectives of Quantum Annealing: Methods and Implementations", arXiv preprint arXiv:1903.06559 (2019), 37 pgs.
Heeres et al., "Implementing a Universal Gate Set on a Logical Qubit Encoded in an Oscillator",arXiv:1608.02430 (2016), 16 pgs.
Heim et al., "Quantum versus Classical Annealing of Ising Spin Glasses", Science 348, 215, arXiv:1411.5693v1 (2014), 5 pgs.
Hillar et al., "Most Tensor Problems are NP-Hard", Journal of the ACM (JACM) 60, 1 (2013), 38 pgs.
Hochbaum, "Approrimation Algorithms for NP-Hard Problems", ACM Sigact News 28, 40 (1997), 13 pgs.
Ibrahimi et al. "The Set of Solutions of Random XORSAT Formulae", Proceedings of the twenty-third annual ACM-SIAM symposium on Discrete Algorithms (SIAM, 2012), pp. 760-779.
Isakov et al. "Understanding Quantum Tunneling through Quantum Monte Carlo Simulations", Physical review letters 117, 180402 (2016), 180402-1-180402-6.
Jiang et al, "Path-Integral Quantum Monte Carlo Simulation with Open-Boundary Conditions", Physical Review A 96, 042330 (2017), 11 pgs.
Jiang et al., "Scaling Analysis and Instantons for Thermally-Assisted Tunneling and Quantum Monte Carlo Simulations", Physical Review A 95, 012322 (2017), 15 pgs.
Jones et al., "Random Max-CSPs Inherit Algorithmic Hardness from Spin Glasses",arXiv preprint arXiv:2210.03006v2 (2023), 41 pgs.
Kadowaki et al., "Quantum Annealing in the Transverse Ising Model", Physical Review E 58, 5355 (1998), 23 pgs.
Kapit et al., "Noise-Tolerant Quantum Speedups without Fine Tuning", Quantum Science and Technology 6, 025013 (2021), 31 pgs.
Kapit, "Error-Transparent Quantum Gates for Small Logical Qubit Architectures", arXiv:1703.09762 (2017), 8 pgs.
Kapit, "Hardware-Efficient and Fully Autonomous Quantum Error Correction in Superconducting Circuits", Phys. Rev. Lett. 116, 150501 (2016), 10.1103/PhysRevLett.116.150501, 150501-1-150501-5.
Kapit, "Error-Transparent Quantum Gates for Small Logical Qubit Architectures", Physical review letters 120, 050503 (2018), 050503-1-050503-5.
Kapit, "The Upside of Noise: Engineered Dissipation as a Resource in Superconducting Circuits", Quantum Science and Technology 2, 033002 (2017), 24 pgs.
Kechedzhi et al., "Efficient Population Transfer via Non-Ergodic Extended States in Quantum Spin Glass", arXiv preprint arXiv:1807.04792 (2018), 16 pgs.
Kim et al., "Rydberg Quantum Wires for Maximum Independent Set Problems with Nonplanar and High-Degree Graphs", arXiv preprint arXiv:2109.03517 (2021), 8 pgs.
King et al., "Scaling Advantage in Quantum Simulation of Geometrically Frustrated Magnets", et al., arXiv preprint arXiv:1911.03446 (2019), 29 pgs.
Knysh, "Zero-Temperature Quantum Annealing Bottlenecks in the Spin-Glass Phase", Nature communications 7 (2016), 9 pgs.

(56) References Cited

OTHER PUBLICATIONS

Könz et al., "Embedding Overhead Scaling of Optimization Problems in Quantum Annealing", PRX Quantum 2, 040322 (2021), 040322-1-040322-11.

Korte et al., "Combinatorial Optimization", Fifth Edition, vol. 11 (Springer, 2011), 664 pgs.

Kowalsky et al. "3-Regular 3-XORSAT Planted Solutions Benchmark of Classical and Quantum Heuristic Optimizers", arXiv preprint arXiv:2103.08464v2, (2022), 17 pgs.

Krzakala et al., "Landscape Analysis of Constraint Satisfaction Problems", Physical Review E 76, 021122 (2007), 021122-1-021122-13.

Kuwahara et al. "Floquet-Magnus Theory and Generic Transient Dynamics in Periodically Driven Many-Body Quantum Systems", Annals of Physics 367, 96 (2016), 19 pgs.

S. Adachi, "III-V Ternary and Quaternary Compounds," in Springer Handbook of Electronic and Photonic Materials, edited by S. Kasap and P. Capper (Springer International Publishing, Cham, 2017) pp. 725-741.

M. P. C. M. Krijn, "Heterojunction band offsets and effective masses in III-V quaternary alloys," Semiconductor Science and Technology 6, 27-31 (1991).

B. Streetman and S. Banerjee, "Energy bands and charge carriers in semiconductors," in Solid State Electronic Devices (Pearson, 2015) Chap. 5, pp. 238-243.

"AC/DC Module User's Guide", https://doc.comsol.com/5.5/docserver/#!/com.comsol.help.acdc/html_ACDCModuleManual.html, (2020), pp. 1-366.

"Semiconductor Module User's Guide", https://doc.comsol.com/5.5/docserver/#!/com.comsol.help.semicond/html_SemiconductorModuleManual.html, (2020), pp. 1-309.

Ancona, M. G., "Density-Gradient Theory: A Macroscopic Approach to Quantum Confinement and Tunneling in Semiconductor Devices", Journal of Computational Electronics 10:65-97, (2011), pp. 1-34.

Arute, et al., "Quantum Supremacy using a Programmable Superconducting Processor", Article, Nature 574, (2019), pp. 505-510.

Barends, et al., "Diabatic Gates for Frequency-Tunable Superconducting Qubits", Phys. Rev. Lett. 123, 210501, (2019), pp. 210501-1-210501-6.

Bialczak, et al., "Fast Tunable Coupler for Superconducting Qubits", Phys. Rev. Lett. 106, 060501, (2011), pp. 060501-1-060501-4.

Casparis, et al., "Voltage-Controlled Superconducting Quantum Bus", Phys. Rev. B 99, 085434, (2019), pp. 085434-1-085434-7.

Hirabayashi, et al., "Dielectric Theory of the Barrier Height at Metal-Semiconductor and Metal-Insulator Interfaces", Phys. Rev. B, vol. 3, (1971), pp. 4023-4025.

Huang, et al., "Universal Stabilization of Single-Qubit States using a Tunable Coupler", Phys. Rev. A97, 062345, (2018), pp. 062345-1-062345-11.

Kim, et al., "Notes on Fermi-Dirac Integrals 4th Edition", arXiv:0811.0116 [cond-mat.mes-hall], (2019), pp. 1-15.

Koch, et al., "Charge-Insensitive Qubit Design Derived from the Cooper Pair Box", Phys. Rev. A 76, 042319, (2007), pp. 042319-1-042319-19.

Larsen, et al., "Semiconductor-Nanowire-Based Superconducting Qubit", Phys. Rev. Lett. 115, 127001, (2015), pp. 127001-1-127001-5.

Li, et al., "Improvements in Silicon Oxide Dielectric Loss for Superconducting Microwave Detector Circuits", IEEE Transactions on Applied Superconductivity, 1501204. vol. 23, No. 3, (2013), pp. 1-4.

Lu, et al., "Universal Stabilization of a Parametrically Coupled Qubit", Phys. Rev. Lett. 119, 150502, (2017), pp. 150502-1-150502-5.

Mayer, W., "Superconducting Proximity Effect in Epitaxial Al-InAs Heterostructures", Appl. Phys. Lett. 114, 103104, (2019), pp. 103104-1-103104-5.

McRae, et al., "Cryogenic Microwave Loss in Epitaxial Al/GaAs/Al Trilayers for Superconducting Circuits", arXiv:2009.10101, (2020), pp. 1-5.

Minev, Z. K., "Catching and Reversing a Quantum Jump Mid-Flight", arXiv:1902.10355 [quant-ph], (2019), pp. 1-209.

Minev, et al., "Energy-Participation Quantization of Josephson Circuits", arXiv:2010.00620 [quant-ph], (2020), pp. 1-42.

Nigg, et al., "Black-Box Superconducting Circuit Quantization", Phys. Rev. Lett. 108, 240502, (2012), pp. 240502-1-240502-5.

Oliver, W. D., "Materials in Superconducting Quantum Bits", MRS Bulletin, vol. 38, (2013), pp. 816-825.

Orlando, et al., "Superconducting Persistent-Current Qubit", Phys. Rev. B 60, 15398, (1999), pp. 15398-15413.

Sardashti, et al., "Voltage-Tunable Superconducting Resonators: A Platform for Random Access Quantum Memory", IEEE Transactions on Quantum Engineering, 5502107, vol. 1, (2020), pp. 1-7.

Schuster, D. I., "Circuit Quantum Electrodynamics, Ph.D. Thesis", Yale University, (2007), pp. 1-255.

Scigliuzzo, et al., "Phononic Loss in Superconducting Resonators on Piezoelectric Substrates", New Journal of Physics 22, 053027, (2020), pp. 1-9.

Solgun, et al., "Blackbox Quantization of Superconducting Circuits using Exact Impedance Synthesis", Phys. Rev. B 90, 134504, (2014), pp. 134504-1-134504-12.

Wang, C., "Surface Participation and Dielectric Loss in Superconducting Qubits", Appl. Phys. Lett. 107, 162601, (2015), pp. 2-11.

Wenner, et al., "Surface Loss Simulations of Superconducting Coplanar Waveguide Resonators", Appl. Phys. Lett. 99, 113513, (2011), pp. 1-4-S1-S4.

Wickramasinghe, et al., "Transport Properties of Near Surface InAs Two-Dimensional Heterostructures", Appl. Phys. Lett. 113, 262104, (2018), pp. 1-5.

Yang et al., "Optimizing Variational Quantum Algorithms Using Pontryagin's Minimum Principle", Physical Review X 7, 021027 (2017), pp. 021027-1-021027-10.

Zhang et al., "Adaptive variational Quantum Eigensolvers for Highly Excited States", Physical Review B 104, 075159 (2021), pp. 075159-1-075159-9.

Zhu et al., "Adaptive Quantum Approximate Optimization Algorithm for Solving Combinatorial Problems on a Quantum Computer", Physical Review Research 4, 033029 (2022), pp. 033029-1-033029-9.

Abanin, et al. "Exponentially Slow Heating in Periodically Driven Many-Body Systems", Physical Review Letters 115, 256803 (2015), pp. 1-5.

Abdelhafez et al., "Universal Gates for Protected Superconducting Qubits using Optimal Control", Physical Review A 101, 022321 (2020), pp. 022321-1-022321-13.

Abrams et al, "Implementation of the XY Interaction Family with Calibration of a Single Pulse", arXiv preprint arXiv:1912.04424 (2019), pp. 1-13.

Albash et al., "Adiabatic Quantum Computing", arXiv:1611.04471v2 (2018).

Albash et al., "Demonstration of a Scaling Advantage for a Quantum Annealer over Simulated Annealing", Physical Review X 8, 031016 (2018), pp. 031016-1-031016-26.

Albert et al. "Holonomic Quantum Control with Continuous Variable Systems", Phys. Rev. Lett. 116, 140502 (2016) pp. 1-6.

Albert et al, "Pair-Cat Codes: Autonomous Error-Correction with Low-Order Nonlinearity", Quantum Science and Technology 4, 035007 (2019), pp. 1-29.

Alekhnovich, "More on Average Case vs Approximation Complexity", 44th Annual IEEE Symposium on Foundations of Computer Science, 2003. Proceedings. (IEEE, 2003), pp. 1-10.

Allen et al., "How to Refute a Random CSP", 2015 IEEE 56th Annual Symposium on Foundations of Computer Science (IEEE, 2015), pp. 689-708.

Altarelli et al. "Relationship between Clustering and Algorithmic Phase Transitions in the Random k-XORSAT Model and its NP-Complete Extensions", Journal of Physics: Conference Series (IOP Publishing, 2008), vol. 95, p. 012013, pp. 1-16.

(56) References Cited

OTHER PUBLICATIONS

Altshuler et al. Anderson Localization makes Adiabatic Quantum Optimization Fail, Proceedings of the National Academy of Sciences 107, 12446 (2010), 5 pgs.
Andriyash et al., "Can Quantum Monte Carlo Simulate Quantum Annealing?", arXiv preprint arXiv:1703.09277 (2017), pp. 1-12.
Anshu et al, "Concentration Bounds for Quantum States and Limitations on the QAOA from Polynomial Approximations", Quantum 7, 999 (2023), pp. 1-28.
Anshu et al, "Improved Approximation Algorithms for Bounded-Degree Local Hamiltonians", Physical Review Letters 127, 250502 (2021), pp. 250502-1-250502-6.
Arora et al., "Computational Complexity: a Modern Approach", Draft of Book: Dated Jan. 2007, Cambridge University Press, 2009), 489 pgs.
Atia et al., "How the High-Energy Part of the Spectrum Affects the Adiabatic Computation Gab", arXiv preprint arXiv:1906.02581 (2019) pp. 1-14.
Babbush et al. "Focus Beyond Quadratic Speedups for Error-Corrected Quantum Advantage", PRX Quantum 2, 010103 (2021) pp. 010103-1-010103-11.
Baldwin et al., "Quantum Algorithm for Energy Matching in Hard Optimization Problems", Physical Review B 97, 224201 (2018), pp. 224201-1-002201-19.
Baldwin et al., "The Many-Body Localized Phase of the Quantum Random Energy Model" Physical Review B 93, 024202 (2016), pp. 024202-1-024202-15.
Baldwin, "Clustering of Nonergodic Eigenstates in Quantum Spin Glasses ", Physical Review Letters 118, 127201 (2017), pp. 127201-1-127201-6.
Bao et al., "Optimal Control of Superconducting Gmon Qubits using Pontryagin's Minimum Principle: Preparing a Maximally Entangled State with Singular Bang-Bang Protocols", Physical Review A 97, 062343 (2018), pp. 062343-1-062343-8.
Bapst et al., The Quantum Adiabatic Algorithm Applied to Random Optimization Problems: The Quantum Spin Glass Perspective, Physics Reports 523, 127, arXiv: 1210.0811v2, (2012), 154 pgs.
Barak et al., "Beating the Random Assignment on Constraint Satisfaction Problems of Bounded Degree", arXiv preprint arXiv:1505.03424 (2015).
Barends et al., "Logic Gates at the Surface Code threshold: Superconducting Qubits Poised for Fault-Tolerant Quantum Computing", Nature 508, 500, 10.1038/nature13171 (2014), 16 pgs.
Basso et al. "Performance and Limitations of the QAOA at Constant Levels on Large Sparse Hypergraphs and Spin Glass Models", 2022 IEEE 63rd Annual Symposium on Foundations of Computer Science (FOCS) (IEEE, 2022), pp. 335-343.
Basso et al. "The Quantum Approximate Optimization Algorithm at High Depth for MaxCut on Large-Girth Regular Graphs and the Sherrington-Kirkpatrick Model", arXiv preprint arXiv:2110.14206v3 (2022), 39 pgs.
Bauza et al., "Scaling Advantage in Approximate Optimization with Quantum Annealing", arZiv:2401.07184v1 (2024), 11 pgs.
Bellitti et al., "Entropic Barriers as a Reason for Hardness in Both Classical and Quantum Algorithms", zrXiv:2102.000182v2 (2021).
Benchasattabuse et al., "Lower Bounds on No. of QAOA Rounds Required for Guaranteed Approximation Rations", arXiv preprint arXiv:2308.15442 (2023), 16 pgs.
Blais et al. "Tunable Coupling of Superconducting Qubits", Phys. Rev. Lett. 90, 127901 (2003), 127901-1-127901-4.
Boixo et al. "Quantum Annealing with More than One Hundred Qubits", Nature Physics 10, 218, arXiv:1304.4595v2 (2013), 26 pgs.
Boulebnane et al., "Predicting Parameters for the Quantum Approximate Optimization Algorithm for MAX-CUT from the Infinite-Size Limit", arXiv preprint arXiv:2110.10685 (2021), 59 pgs.
Bravyi et al. "Hybrid Quantum-Classical Algorithms for Approximate Graph Coloring", Quantum 6, 678 (2022), 27 pgs.
Bravyi et al "Schrieffer-Wolff Transformation for Quantum Many-Body Systems", Annals of physics 326, 2793 (2011), 50 pgs.
Bylander et al., "Dynamical Decoupling and Noise Spectroscopy with a Superconducting Flux Qubit", Nature Physics 7, 565 (2011), 24 pgs.
Čepaité et al, "Counterdiabatic Optimized Local Driving", PRX Quantum 4, 010312 (2023), URL https://link.aps. org/doi/10.1103/PRXQuantum.4.010312, pp. 010312-1-010312-21.
Chen et al., "Qubit Architecture with High Coherence and Fast Tunable Coupling", Phys. Rev. Lett. 113, 220502 (2014), pp. 220502-1-220502-5.
Choi, "Minor-Embedding in Adiabatic Quantum Computation: II. Minor-Universal Graph Design", Quantum Information Processing 10, 343, zrXiv:1001.3116v2 (2010), 13 pgs.
Choi "Minor-Embedding in Adiabatic Quantum Computation: I. The Parameter Setting Problem", Quantum Information Processing 7, 193 (2008), 20 pgs.
Cohen et al., "Dissipation-Induced Continuous Quantum Error Correction for Superconducting Circuits", Phys. Rev. A. 90, 062344 (2014), 062344-1-062344-9.
Crescenzi et al, "A Compendium of NP Optimization Problems", (1995), 118 pgs.
D'Orsi et al, "A Ihara-Bass Formula for Non-Boolean Matrices and Strong Refutations of Random CSPs", arXiv preprint arXiv:2204.10881v2 (2023), 67 pgs.
Dalzell et al, "Mind the Gab: Achieving a Super-Grover Quantum Speedup by Jumping to the End", in Proceedings of the 55th Annual ACM SymposiumonTheory of Computing (2023), pp. 1131-1144.
Das et al., "Colloquium: Quantum Annealing and Analog Quantum Computation", Reviews of Modern Physics 80, 1061 (2008), 21 pgs.
Dempster et al.,"Understanding Degenerate Ground States of a Protected Quantum Circuit in the Presence of Disorder", Physical Review B 90, 094518 (2014), 094518-1-094518-12.
Deng et al, "Majorana Bound States in a Coupled Quantum-Dot Hybrid-Nanowire System", Science 354, 1557, arXiv: 1612.07989v2 (2017), 24 pgs.
Derrida, "Random-Energy Model: Limit of a Family of Disordered Models", Physical Review Letters 45, 79 (1980), 5 pgs.
Dubois et al., "The 3-XORSAT Threshold", Comptes Rendus Mathematique 335, 963 (2002), pp. 963-966.
Ebadi et al, "Quantum Optimization of Maximum Independent Set using Rydberg Atom Arrays", Science 376, 1209 (2022), 42 pgs.
Farhi et al. "A Quantum Approximate Optimization Algorithm", arXiv preprint arXiv:1411.4028v1 (2014), 16 pgs.
Wang et al., "Electronic Structure Pseudopotential Calculations of Large (~1000 Atoms) Si Quantum Dots", J. Phys. Chem. 1994, 98, 8, 2158-2165.
Devoret et al., "Superconducting Circuits for Quantum Information: An Outlook", Science, Mar. 8, 2013, vol. 339, Issue 6124, pp. 1169-1174.
Earl et al., "Parallel Tempering: Theory, Applications, and New Perspectives", arXiv: physics/0508111v2 [physics.comp-ph], Aug. 19, 2005.
Johnson et al., "Quantum Annealing with Manufactured spins", Nature 473, 194-198 (2011).
Jörg et al., "Energy Gaps in Quantum First-Order Mean-Field-Like Transitions: The problems that Quantum Annealing Cannot Solve", arXiv:0912.4865v2 [quant-ph] Jan. 28, 2010.
Khot et al., "Linear Equations Modulo 2 and the L1 Diameter of Convex Bodies", in 2007 48th Annual IEEE Symposium on Foundations of Computer Science, Providence, RI, 2007, pp. 318-328.
King, Andrew D., et al. "Observation of Topological Phenomena in a Programmable Lattice of 1,800 Qubits." Nature, vol. 560, No. 7719, Aug. 2018, p. 456. Gale OneFile: Health and Medicine.
Monasson, Rémi, Optimization Problems and Replica SOymmetry Breaking in Finite Connectivity Spin Glasses. Journal of Physics A: Mathematical and General, vol. 31, Issue 2, pp. 513-529 (1998).
Sahni et al, "P-Complete Approximation Problems", Journal of the ACM (JACM), vol. 23, Issue 3, pp. 555-565.
J. D. Ullman, "NP-Complete Scheduling Problems," Journal of Computer System Sciences, vol. 10, No. 3, 1975, pp. 384-393.
Wang et al., "Solving Schrodinger's Equation Around a Desired Energy: Application to Silicon Quantum Dots", J. Chem. Phys. Feb. 1, 1994; 100 (3): 2394-2397.

(56) References Cited

OTHER PUBLICATIONS

Woeginger, G.J., "Exact Algorithms for NP-Hard Problems: A Survey. In: Jünger, M., Reinelt, G., Rinaldi, G. (eds) Combinatorial Optimization—Eureka, You Shrink!", Lecture Notes in Computer Science, vol. 2570. pp 185-207, Springer, Berlin, Heidelberg (2003).
Wei Xu et al., "Clustering Phase of a General Constraint Satisfaction Problem Model d-k-CSP, Physica A: Statistical Mechanics and its Applications", vol. 537, 2020, 122708.
Kapit, et al., "On the approximability of random-hypergraph MAX-3-XORSAT problems with quantum algorithms", May 20, 2024, 43 pgs.
Campbell, Earl, "Random compiler for fast Hamiltonian simulation", Physical review letters 123, No. 7 (2019): 070503. (Year: 2019).
Nichol, et al., "High-fidelity entangling gate for double-quantum-dot spin qubits", npj Quantum Information 3, No. 1 (2017): 3. (Year: 2017).
Venturelli, et al., "Compiling quantum circuits to realistic hardware architectures using temporal planners", Quantum Science and Technology 3, No. 2 (2018): 025004. (Year: 2018).

\* cited by examiner

SYSTEMS AND METHODS FOR ACCELERATED QUANTUM OPTIMIZATION

CROSS-REFERENCE TO RELATED APPLICATIONS

This application claims priority under 35 U.S.C. § 119 to U.S. provisional patent application No. 62/903,426, entitled "Systems and Methods for Accelerated Quantum Optimization," filed on 20 Sep. 2019, which is incorporated by reference herein for all purposes.

GOVERNMENT LICENSE RIGHTS

This invention was made with government support under grant number PHY-1653820 awarded by the National Science Foundation. The government has certain rights in the invention.

BACKGROUND

As quantum computing has evolved, one persistent obstacle is random error introduction caused by unstable or noisy qubits and gates. To mitigate the effect of error introduced by the unstable or noisy qubits and gates often involves the use of multiple physical qubits for each logical qubit. For guaranteed fault tolerance, the number of physical qubits per logical qubit can reach into the hundreds or thousands. In addition to the overhead of the substantial number of physical qubits per logical qubit, decoding the error codes represented by the physical qubits to reveal the logical qubit adds to the overhead. The substantial overhead may make implementation of quantum computing applications difficult or expensive. Development of fault tolerant applications and architectures may present a desirable alternative.

DETAILED DESCRIPTION

This disclosure includes apparatuses, systems, and methods for accelerated quantum optimization and machine learning using oscillating fields, dissipation, and qubit resets related to radio frequency quantum annealing or random field quantum annealing (RFQA) described with reference to PCT Application Pub. No. WO 2019/084286, which is incorporated herein in its entirety. This disclosure will break up the described methods into three parts: hardware improvements, use methods (e.g., machine learning), and digital methods. As described below, RFQA can provide a quantum acceleration of cooling and thermalization, and thus accelerate both machine learning and optimization. Further, RFQA could be adapted to digital quantum computer architectures with qubit resets to act as a cooling mechanism.

Figure 1:
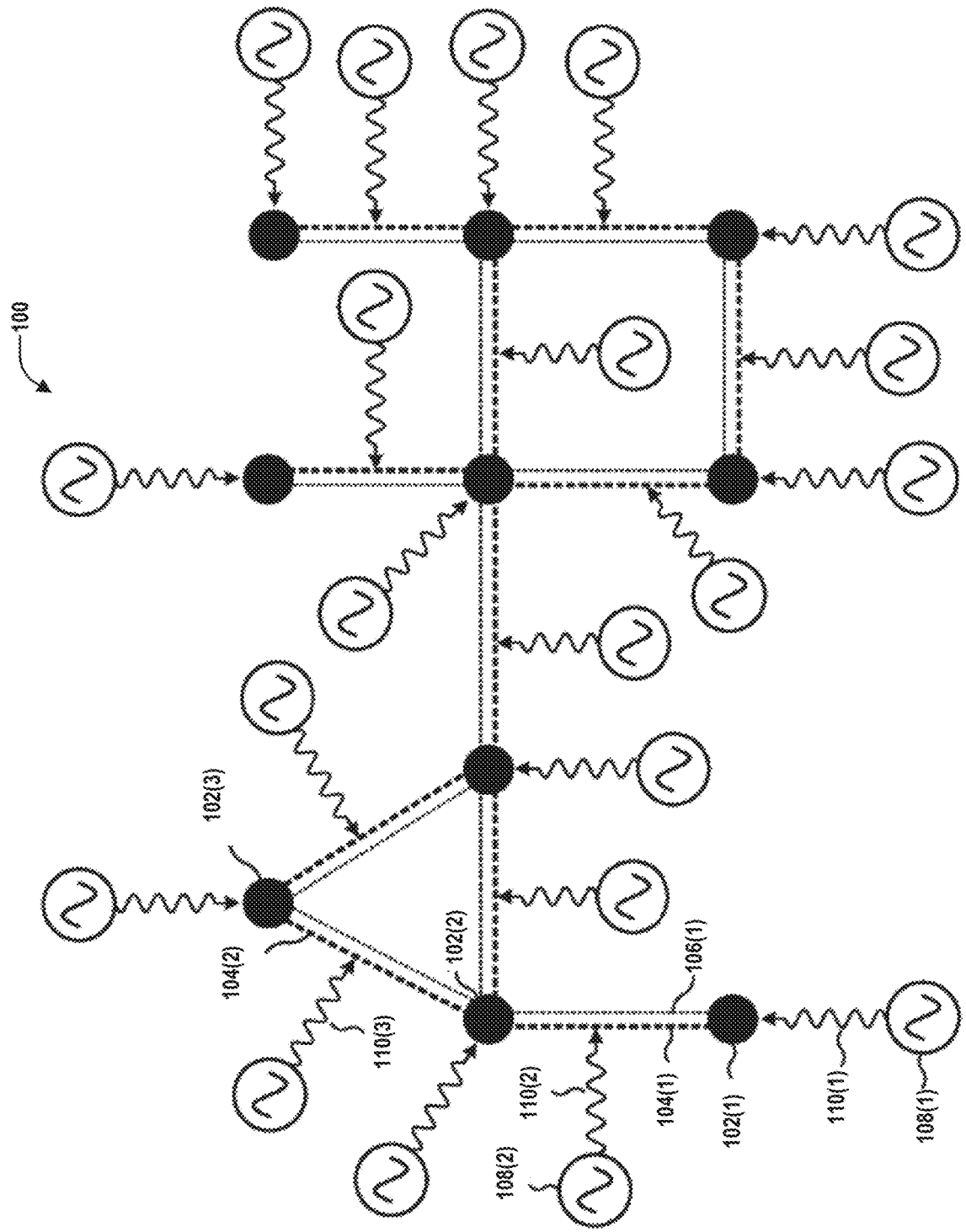
FIG. 1 includes a functional diagram of an example many-body quantum system (MBQS) with multiple interqubit couplings between pairs of qubits, in accordance with embodiments of the disclosure.

FIG. 1 includes a functional diagram of an example many-body quantum system (MBQS) 100 with multiple interqubit couplings between pairs of qubits, in accordance with embodiments of the disclosure. The MBQS 100 is formed from a group of qubits 102(1), 102(2), 102(3), etc., coupled to each other with respective longitudinal interqubit couplings 106(1), 106(2), 106(3), etc., and transverse interqubit couplings 104(1), 104(2), 104(3), etc. Each of longitudinal interqubit couplings 106(1), 106(2), 106(3), etc., represents one longitudinal interqubit coupling term. Similarly, each of the transverse interqubit couplings 104(1), 104(2), 104(3), etc., represents one transverse interqubit coupling term. However, a pair of qubits 102(1), 102(2), 102(3), etc., may have more than one transverse interqubit couplings 104(1), 104(2), 104(3), etc., (e.g., fully transverse interqubit coupling and partially transverse interqubit coupling). The MBQS 100 is shown as a graph having a plurality of vertices interconnected with a plurality of edges, where each of the vertices represents one of qubits 102(1), 102(2), 102(3), etc. and each of the edges represents one of interqubit couplings 104(1), 104(2), 104(3), etc.

The MBQS 100 further includes a group of oscillating field sources 108(1), 108(2), 108(3), etc., driving the qubits 102(1), 102(2), 102(3), etc., and the transverse interqubit couplings 104(1), 104(2), 104(3), etc., with oscillating fields 110(1), 110(2), 110(3), etc., according to driver Hamiltonian HD/M(t) so as to modulate the transverse interqubit couplings 104(1), 104(2), 104(3), etc. For example, the oscillator 108(2) generates the oscillating field 110(2) that modulates the transverse interqubit coupling 104(1). In another example, the oscillator 108(1) drives qubit 102(1) with oscillating field 110(1).

Figure 2:
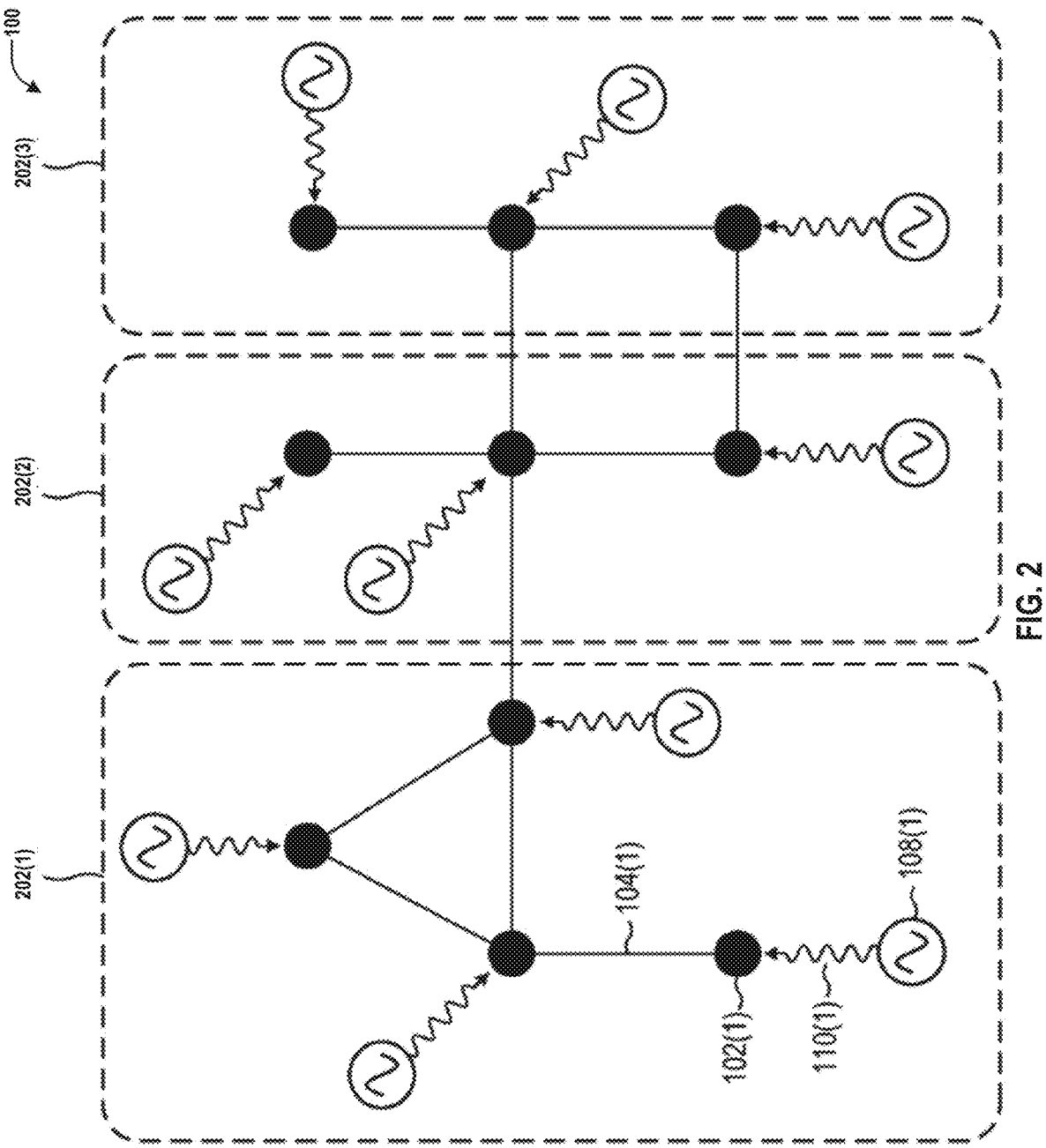
FIG. 2 includes a functional diagram of the example many-body quantum system (MBQS) of FIG. 1 with qubits and oscillating fields divided into groups, in accordance with embodiments of the disclosure.

FIG. 2 includes a functional diagram of the example many-body quantum system (MBQS) of FIG. 1 with qubits and oscillating fields divided into groups, in accordance with embodiments of the disclosure. The MBQS 100 may include elements that have been previously described with respect to the MBQS 100 of FIG. 1. Those elements have been identified in FIG. 2 using the same reference numbers used in FIG. 1 and operation of the common elements is as previously described. Consequently, a detailed description of the operation of these particular elements will not be repeated in the interest of brevity. FIG. 2 depicts the MBQS 100 with only the transverse interqubit couplings 104(1), 104(2), 104(3), etc., for clarity. The longitudinal interqubit couplings 106(1), 106(2), 106(3), etc., would also present in FIG. 2 without departing from the scope of the disclosure. As shown in FIG. 2, the qubits 102(1), 102(2), 102(3), etc., and oscillating fields 110(1), 110(2), 110(3), etc., may be divided into groups 202(1), 202(2), and 202(3). Specifically, first group 202(1) contains four of the qubits 102(1), 102(2), 102(3), etc., and four of oscillating fields 110(1), 110(2), 110(3), etc., and each of second group 202(2) and third group 202(3) contain respective three of the qubits 102(1), 102(2), 102(3), etc., and respective three of the oscillating fields 110(1), 110(2), 110(3), etc. The MBQS 100 may be divided into more or fewer than three groups, and each of the groups may include more or fewer than three or four of the respective the qubits 102(1), 102(2), 102(3), etc., and/or the oscillating fields 110(1), 110(2), 110(3), etc. In some embodiments, all of oscillating fields 110(1), 110(2), 110(3), etc., of one of the groups 202(1), 202(2), and 202(3) may have an identical frequency and an identical phase. In some examples, synchronizing the frequencies and phases of the oscillating fields 110(1), 110(2), 110(3), etc., of one the groups 202(1), 202(2), and 202(3) may advantageously drives the respective qubits 102(1), 102(2), 102(3), etc., of the group such that oscillations of the transverse interqubit coupling 104(1), 104(2), 104(3), etc., fields interfere constructively, boosting a strength of a driving term.

In one embodiment, the oscillators 108(1), 108(2), 108(3), etc., generating oscillating fields 110(1), 110(2), 110(3), etc., one group (i.e., one the groups 202(1), 202(2), and 202(3)) are phase-locked (e.g., to common reference frequency), such that the oscillating fields 110(1), 110(2), 110(3), etc., have the identical frequency and the identical phase of the one group. In another embodiment, all of oscillating fields 110(1), 110(2), 110(3), etc., of the one group are generated by one of oscillators 108(1), 108(2), 108(3), etc., where a power splitter divides the one output of the one of oscillators 108(1), 108(2), 108(3), etc., into a number of identical outputs that drive the qubits 102(1), 102(2), 102(3), etc., of the one group. The identical frequency may vary between groups 702, such that each of groups 702 is assigned a distinct frequency.

While FIGS. 1 and/or 2 show the MBQS 100 with ten qubits 102(1), 102(2), 102(3), etc., ten longitudinal interqubit couplings 106(1), 106(2), 106(3), etc., and ten transverse interqubit couplings 104(1), 104(2), 104(3), etc., the MBQS 100 may have any number of qubits and/or any number of longitudinal or transverse interqubit couplings, as needed to implement a problem Hamiltonian, without departing from the scope of the disclosure.

The MBQS 100 of FIGS. 1 and 2 may be configured to implement the radio frequency quantum annealing or random field quantum anneal (RFQA) described with reference to PCT Application Pub. No. WO 2019/084286, which is incorporated herein in its entirety.

Generally, the RFQA method involves a variant of quantum annealing that involves applying coherent oscillations (e.g., via the group of oscillators 108(1), 108(2), 108(3), etc.) of transverse fields (or transverse couplers as in 104(1), 104(2), 104(3), etc.). In this system, an exponential proliferation of weak multi-photon resonances generated by applying the low-frequency oscillating fields is capable of dramatically accelerating the search for ground states of frustrated spin glass as compared with quantum annealing processes that do not include applying oscillations to transverse fields. In some examples, achieving this speedup does not require any fine tuning based on the details of the specific problem or its class, aside from a global adjustment of frequency range of the oscillating fields.

New Hardware:

The performance of RFQA may be improved further by adding additional cooling resources to the system. The basic principle is may include the use a lattice of high-energy but lossy degrees of freedom (e.g., lossy superconducting cavities) that is configured to couple to the lattice of primary qubits, either statically (e.g. with capacitive couplers in flux qubits) or through parametric, microwave-driven couplings.

Figure 3:
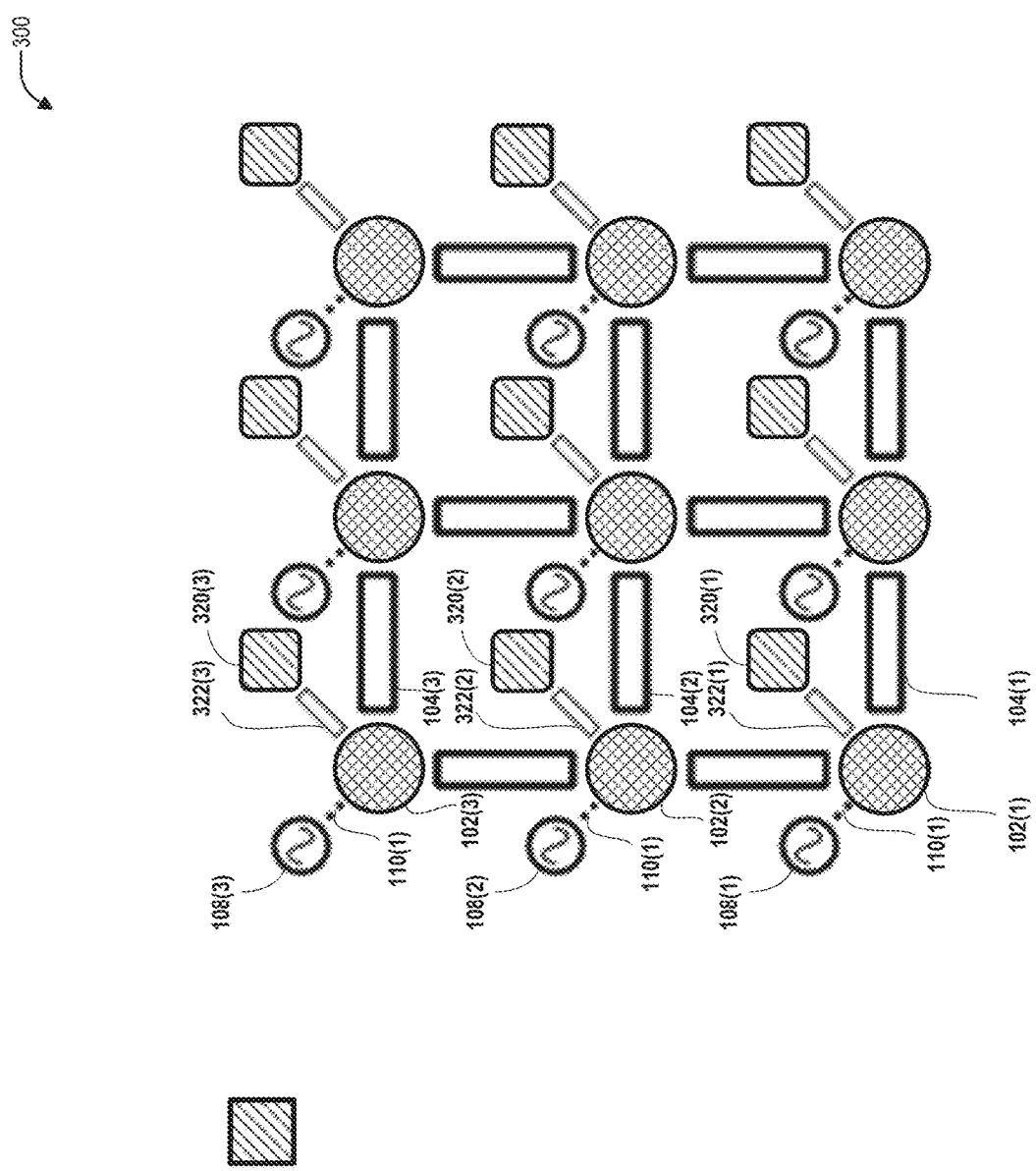
FIG. 3 includes an example layout of a MBQS system that includes the lossy elements in accordance with embodiments of the disclosure.

FIG. 3 includes an example layout of a MBQS system 300 that includes the lossy elements 320(1)-(9) in accordance with embodiments of the disclosure. The MBQS 300 may include elements that have been previously described with respect to the MBQS 100 of FIGS. 1 and/or 2. Those elements have been identified in FIG. 3 using the same reference numbers used in FIGS. 1 and/or 2 and operation of the common elements is as previously described. Consequently, a detailed description of the operation of these particular elements will not be repeated in the interest of brevity.

The qubits 102(1)-(9) are represented by the blue circles, the oscillators 108(1)-(9) are represented by the circles, the oscillating fields 110(1)-(9) are represented by the dashed lines connected to the qubits 102(1)-(9), the transverse interqubit couplings 104(1)-(9) are represented by the larger rectangles, the lossy elements 320(1)-(9) are represented by the red boxes, and the qubit-lossy element couplings 322 (1)-(9) are represented by the smaller rectangles. The qubit-lossy element couplings 322(1)-(9) may be tunable and oscillated similar to the transverse interqubit couplings 104(1)-(9). The lossy elements 320(1)-(9) may include low-Q superconducting resonators. In some examples, each of the qubits 102(1)-(9) may be coupled to a single respective one of the lossy elements 320(1)-(9) for cooling. In other examples, the MBQS 300 may include fewer lossy elements than qubits. In some examples, a count of lossy elements may scale proportionally with a count of qubits, (e.g., for N qubits, the MBQS 300 includes N/2, N/3, N/4, etc., lossy elements).

The lossy elements 320(1)-(9) may lower the effective temperature of the MBQS 300 and accelerate cooling through a quantum many-body cooling mechanism. This may makes the MBQS 300 more likely to find low-energy problem solutions.

In some examples, the RFQA operation using the MBQS 300 may further include continuously varying the effective energies of the lossy elements 320(1)-(9), such as through changing the frequency of parametric couplings to the qubits 102(1)-(9) or using lossy elements 320(1)-(9) with tunable energy to remove excitations from the MBQS 300 over broad frequency ranges.

In some examples, the RFQA operation using the MBQS 300 may further include occasionally exciting degrees of freedom of the lossy elements 320(1)-(9) to add energy to the MBQS 300 in a controlled manner. This may help the MBQS escape suboptimal local minima more quickly.

Figure 4:
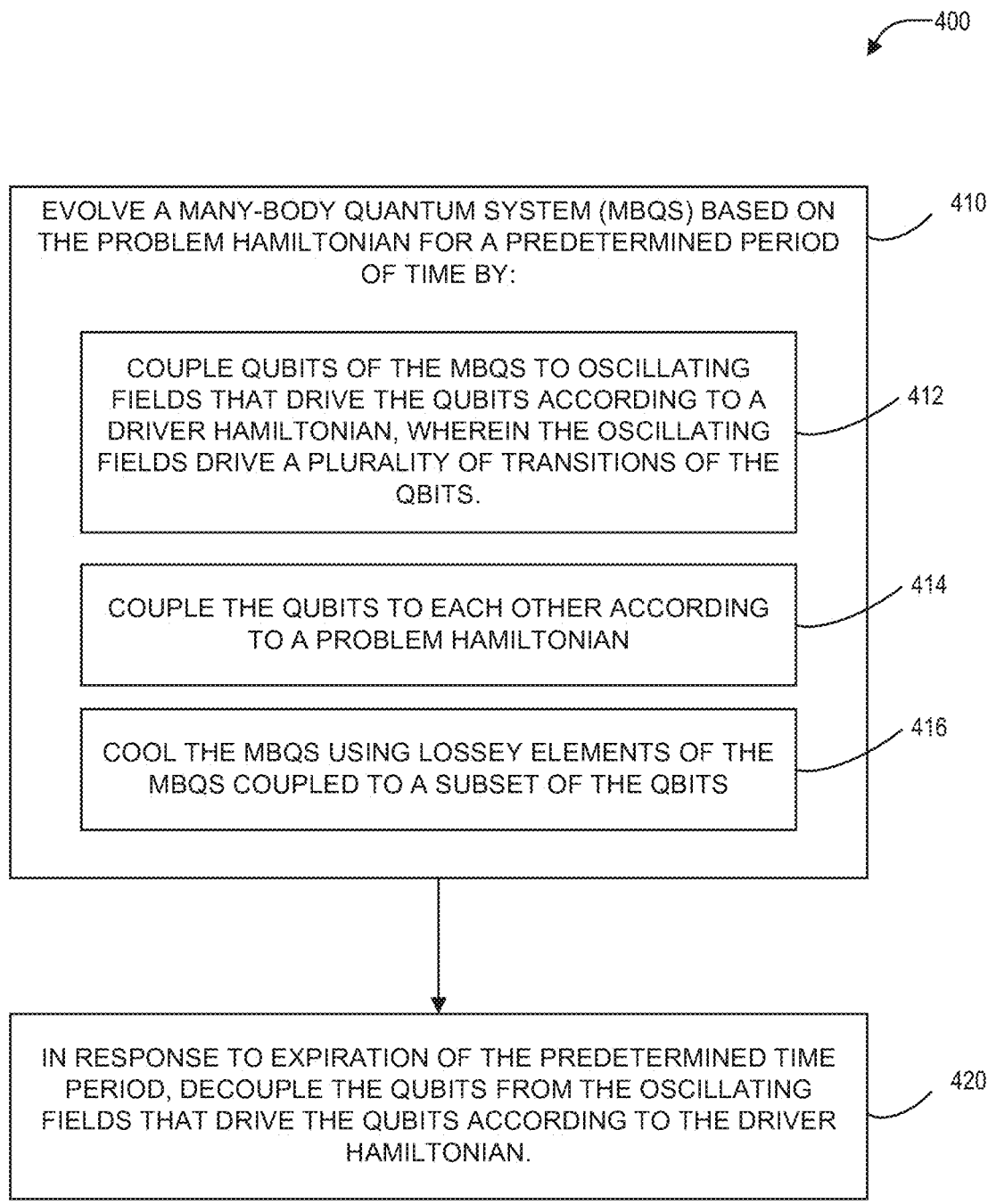
FIG. 4 includes a flowchart depicting a method for implementing RFQA in a MBQS with cooling elements, in accordance with embodiments of the disclosure.

FIG. 4 includes a flowchart depicting a method 400 for implementing RFQA in a MBQS with cooling elements, in accordance with embodiments of the disclosure. The method 400 may be performed using the MBQS 100 of FIGS. 1 and 2 and/or the MBQS 300 of FIG. 3.

The method 400 may include evolving a many-body quantum system (MBQS) based on the problem Hamiltonian for a predetermined period of time, at 410. The evolution may include coupling qubits of the MBQS to oscillating fields that drive the qubits according to a driver Hamiltonian, wherein the oscillating fields drive a plurality of transitions of the qubits, at 412. The qubits may include the qubits 102(1), 102(2), 102(3), etc., of FIGS. 1 and 2 and/or the qubits 102(1)-(9) of FIG. 3. The oscillating fields may include the oscillating fields 110(1), 110(2), 110(3), etc., of FIGS. 1 and 2 and/or the oscillating fields 110(1)-(9) of FIG. 3.

In some examples, the evolution may further include applying the oscillating fields to single qubit transverse field terms and/or to transverse inter-qubit couplings of the MBQS for a set time period. The transverse inter-qubit couplings may include the transverse inter-qubit couplings 104(1), 104(2), 104(3), etc., of FIGS. 1 and 2 and/or the transverse inter-qubit couplings 104(1)-(12) of FIG. 3. In some examples, the method 400 may further include assigning each of the oscillating fields a common amplitude and a selected frequency and sign. In some examples, the method 400 may further include assigning a randomly-frequency chosen from a range of frequencies to the oscillating fields. The range of frequencies may be determined based on the problem Hamiltonian. In some examples, the method 400 may further include assigning a first frequency to a first oscillating field of the oscillating fields and assigning a second frequency for a second oscillating field of the oscillating fields. In some examples, the method 400 may further include assigning a first frequency to a first group of the oscillating fields and assigning a second frequency to a second group of the oscillating fields. In some examples, the method 400 may include causing transverse field terms and coupling terms of the problem Hamiltonian to experience oscillatory rotations around a common set of axes.

The evolution may further include coupling the qubits to each other according to a problem Hamiltonian, at 414. The evolution may further include cooling the MBQS using lossy elements of the MBQS coupled to a subset of the qubits, at 416. In some examples, the lossy elements include low-Q superconducting resonators. The lossy elements may include the lossy elements 320(1)-(9) of FIG. 3. In some examples, cooling the MBQS using the lossy elements of the MBQS may include varying effective energies of the lossy elements, exciting lossy degrees of freedom of the lossy elements to add energy to the MBQS, or any combination thereof. In some examples, varying effective energies of the lossy elements may include changing a frequency of parametric couplings to the qubits, adjusting a tunable energy of the lossy elements, or any combination thereof.

In some examples, the qubits of the MBQS each include a flux qubit having a loop of superconducting wire interrupted by a superconducting quantum interference device (SQUID). In some examples, the method 400 may further include applying the oscillating fields to single qubit transverse field terms and/or to transverse inter-qubit couplings of the MBQS for a set time period by driving the qubits transversely to a quantization axis includes threading an oscillating magnetic flux of each of the oscillating fields through the SQUID of a corresponding flux qubit.

In some examples, the qubits of the MBQS each include a flux qubit having a loop of superconducting wire interrupted by a superconducting quantum interference device (SQUID). In some examples, the method 400 may further include applying the oscillating fields to single qubit transverse field terms and/or to transverse inter-qubit couplings of the MBQS for a set time period by driving the qubits transversely to a quantization axis by coupling an oscillating voltage across the SQUID of a corresponding flux qubit.

The method 400 may further include, in response to expiration of the predetermined time period, decoupling the qubits from the oscillating fields that drive the qubits according to the driver Hamiltonian, at 420, and measuring the quantum state of the qubits.

In some examples, the method 400 may further include measuring a statistical distance based on a quantum state of the MBQS after decoupling the qubits from the oscillating fields for a machine learning algorithm. In some examples, the method 400 may further include measuring an energy of the MBQS based on a quantum state of the MBQS after decoupling the qubits from the oscillating fields for an optimization algorithm.

RFQA Machine Learning Methods

Because RFQA accelerates multiqubit tunneling and "thermalization" (e.g., a neural network reaching an equilibrium state), it may be used to accelerate machine learning as well. In some machine learning applications, thermalization is a key bottleneck. Thus, the RFQA method could be applied to existing quantum machine learning systems to improve performance.

For example, the RFQA method could be applied to a quantum Boltzmann machine, such as the quantum Boltzmann machine described in Amin et al, Physical Review X 8, 021050 (2018)) and other related works. The RFQA method could be operated in any of the ways described in the Amin paper, with the RFQA oscillating fields added to accelerate thermalization.

A version of the RFQA method could also be implemented where some or all of the transverse interqubit couplings are pulsed on and off, such as described in Tanpanitanon et al, arxiv:1906.03860, with random pulses and optimization is done over the pulses. The version of the RFQA method may include pulsing the transverse fields on and off, leaving the transverse fields on and pulsing the oscillating fields on and off, pulsing the same or different "problem" Hamiltonians on and off, or any combination thereof.

In some examples, the RFQA method may be performed on a MBQS that includes lossy elements (e.g., the MBQS 300 of FIG. 3) to implement machine learning. The energies and couplings of the cooling resources (e.g., the lossy elements 320(1)-(9) may be optimized to improve machine learning.

In another example, any of the RFQA versions described above may further include optimizing over random sets of oscillating frequencies in RFQA to improve machine learning.

In some examples, the RFQA machine learning method (e.g., including the method 500 of FIG. 5) may be modified to include "visible" and "hidden" units (e.g., extra qubits included beyond the N used to represent the data) to engineer more complex correlations. Additionally or alternatively, the RFQA machine learning method (e.g., including the method 500 of FIG. 5) may be modified to supervise learning by tagging each sample from an initial dataset {D} to denote specific features the machine learning model should learn. Additionally or alternatively, the RFQA machine learning method (e.g., including the method 500 of FIG. 5) may be modified to construct more complex adversarial models that pit two neural networks against each other in a game. Additionally or alternatively, the RFQA machine learning method (e.g., including the method 500 of FIG. 5) may be modified to use sophisticated heuristics to minimize the number of samples/measurements needed in computing a sample dataset {S}. Additionally or alternatively, the RFQA machine learning method (e.g., including the method 500 of FIG. 5) may be modified to make more clever updates to the parameters of the problem Hamiltonian to reduce the number of times a sample set is generated and a set of correlations are generated and a statistical distance is calculated (e.g., steps 530 and 540 of the method 500 of FIG. 5) are repeated, etc.

Figure 5:
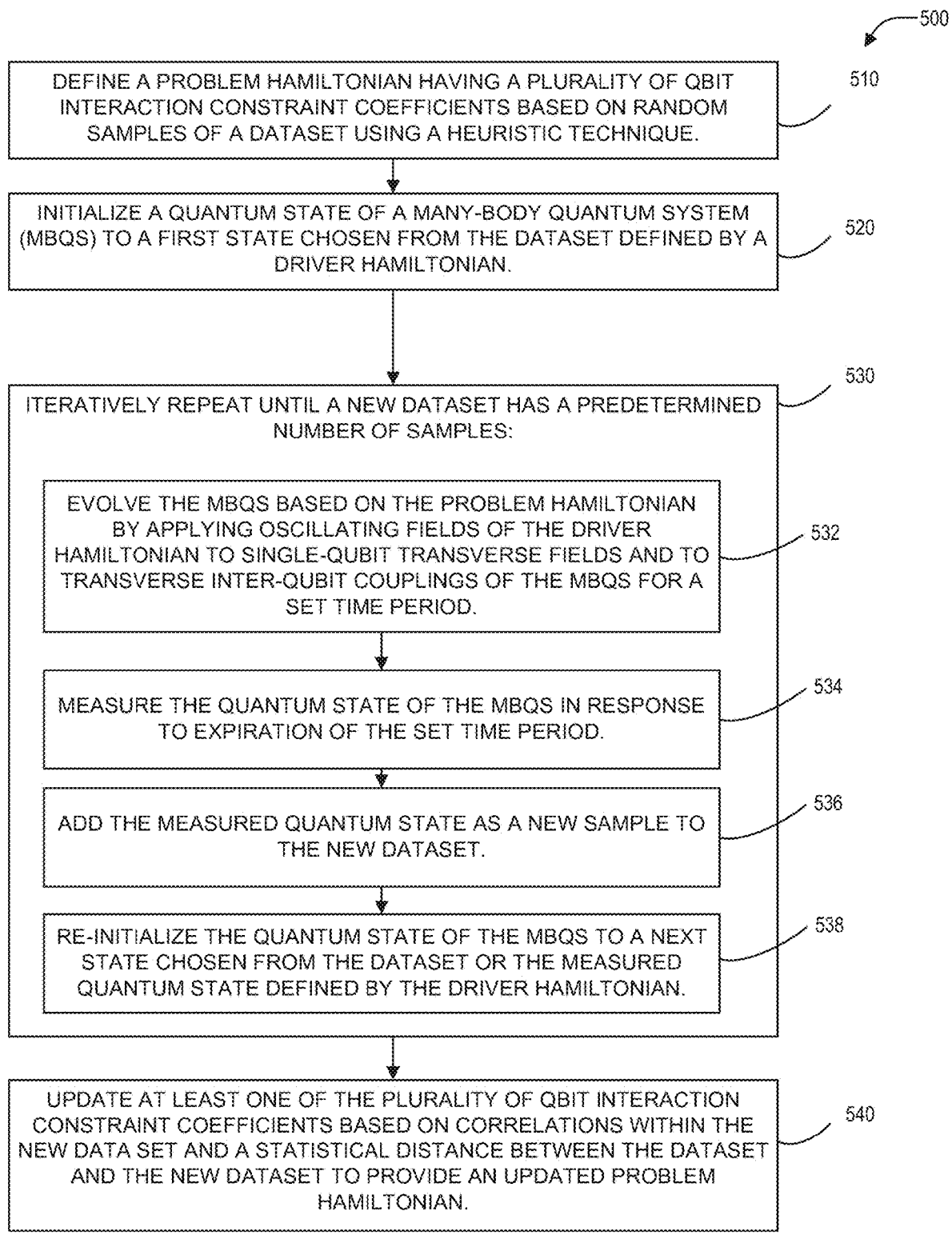
FIG. 5 includes a flowchart depicting a method for implementing RFQA is a MBQS for machine learning, in accordance with embodiments of the disclosure.

FIG. 5 includes a flowchart depicting a method 500 for implementing RFQA is a MBQS for machine learning, in accordance with embodiments of the disclosure. The method 500 may be performed using the MBQS 100 of FIGS. 1 and 2 and/or the MBQS 300 of FIG. 3.

The method 500 may include defining a problem Hamiltonian having a plurality of qubit interaction constraint coefficients based on random samples of a dataset using a heuristic technique, at 510. The method 500 may further include initializing a quantum state of a many-body quantum system (MBQS) to a first state chosen from the dataset defined by a driver Hamiltonian, at 520. In some examples, a count of qubits is at least as great as a count of bits of a sample of the dataset. In some examples, the MBQS includes a first subset of "visible" qubits that correspond to bits of the random samples of the dataset and a second subset of "hidden" qubits that are coupled to induce correlations between the bits of the random samples. The qubits of the MBQS may include the qubits 102(1), 102(2), 102(3), etc., of FIGS. 1 and 2 and/or the qubits 102(1)-(9) of FIG. 3.

The method 500 may further include iteratively repeating the following steps until a new dataset has a predetermined number of samples, at 530: In a first step, evolving the MBQS based on the problem Hamiltonian by applying oscillating fields of the driver Hamiltonian to single qubit transverse field terms and/or to transverse inter-qubit couplings of the MBQS for a set time period, at 532. In a second step, measuring the quantum state of the MBQS in response to expiration of the set time period, at 534. In some examples, an additional step may include disabling the oscillating fields applied to the single qubit transverse field terms and/or to the transverse inter-qubit couplings in response to expiration of the set time period prior to measuring the quantum state of the MBQS. In a third step, adding the measured quantum state as a new sample to the new dataset, at 536. In a fourth step, re-initializing the quantum state of the MBQS to a next state chosen from the dataset or the measured quantum state defined by the driver Hamiltonian, at 538. The predetermined number of samples may be based on a count of qubits of the MBQS.

The oscillating fields may include the oscillating fields 110(1), 110(2), 110(3), etc., of FIGS. 1 and 2 and/or the oscillating fields 110(1)-(9) of FIG. 3. They may couple to transverse coupling terms between qubits, or to transverse fields acting on single qubits. The transverse inter-qubit couplings may include the transverse inter-qubit couplings 104(1), 104(2), 104(3), etc., of FIGS. 1 and 2 and/or the transverse inter-qubit couplings 104(1)-(12) of FIG. 3. In some examples, applying the oscillating fields to the single qubit transverse field terms and/or to the transverse inter-qubit couplings of the MBQS for a set time period including driving the qubits with the oscillating fields according to the driver Hamiltonian so that each of the oscillating fields drives one of the qubits. In some examples, the method 500 may further include assigning each of the oscillating fields a common amplitude and a selected frequency and sign. In some examples, the method 500 may further include assigning a randomly-frequency chosen from a range of frequencies to the oscillating fields. The range of frequencies may be determined based on the problem Hamiltonian. In some examples, the method 500 may further include assigning a first frequency to a first oscillating field of the oscillating fields and assigning a second frequency for a second oscillating field of the oscillating fields. In some examples, the method 500 may further include assigning a first frequency to a first group of the oscillating fields and assigning a second frequency to a second group of the oscillating fields.

In some examples, evolving the MBQS includes cooling the MBQS using lossy elements of the MBQS coupled to a subset of the qubits. In some examples, the lossy elements include low-Q superconducting resonators. The lossy elements may include the lossy elements 320(1)-(9) of FIG. 3. In some examples, cooling the MBQS using the lossy elements of the MBQS may include varying effective energies of the lossy elements, exciting lossy degrees of freedom of the lossy elements to add energy to the MBQS, or any combination thereof. In some examples, varying effective energies of the lossy elements may include changing a frequency of parametric couplings to the qubits, adjusting a tunable energy of the lossy elements, or any combination thereof.

In some examples, the qubits of the MBQS each include a flux qubit having a loop of superconducting wire interrupted by a superconducting quantum interference device (SQUID). In some examples, the method 500 may further include applying the oscillating fields to the single qubit transverse field terms and/or to the transverse inter-qubit couplings of the MBQS for a set time period by driving the qubits transversely to a quantization axis includes threading an oscillating magnetic flux of each of the oscillating fields through the SQUID of a corresponding flux qubit.

In some examples, the qubits of the MBQS each include a flux qubit having a loop of superconducting wire interrupted by a superconducting quantum interference device (SQUID). In some examples, the method 500 may further include applying the oscillating fields to the single qubit transverse field terms and/or to the transverse inter-qubit couplings of the MBQS for a set time period by driving the qubits transversely to a quantization axis by coupling an oscillating voltage across the SQUID of a corresponding flux qubit.

The method 500 may further include updating at least one of the plurality of qubit interaction constraint coefficients based on correlations within the new data set and a statistical distance between the dataset and the new dataset to provide an updated problem Hamiltonian, at 540. The statistical distance may include a Kullback-Liebler divergence. In some examples, the method 500 may further include in response to the statistical distance being below a defined threshold, using the MBQS to generate a second new dataset using the updated problem Hamiltonian.

In some examples, the method 500 may further include causing the transverse field terms and the coupling terms of the problem Hamiltonian to experience oscillatory rotations around a common set of axes.

Optionally, once a set of oscillating fields is chosen, step 530 of the method 500 may instead be performed twice to construct two new datasets: once with the chosen set of oscillating fields used in the previous iteration of step 530, and once with a new randomly generated set of oscillating fields. If the first new dataset generated with the chose set of oscillating fields better approximates the dataset, then keep the chosen set of oscillating fields for the next iteration of step 530. Otherwise, if the second new dataset generated using the randomly-generated set of oscillating fields better approximates the dataset, then use the randomly-generated set of oscillating fields for the next iteration of step 530.

One may also tune the amplitudes and phases of the oscillating fields based on the correlations $\langle \sigma\_i\hat{z} \rangle\_D$, ⟨σ_iˆz σ_jˆz⟩_D. For example, for a particular pair of qubits 1 and 2, if ⟨σ_iˆz σ_jˆz⟩_D≅1 (e.g., the two bits almost always have the same value), then one would likely thermalize more quickly and/or engineer stronger correlations by synchronizing the frequencies and phases of the oscillating fields applied to qubits 1 and 2 in RFQA-D. Similarly, if ⟨σ_iˆz σ_jˆz⟩_D≅−1, one could potentially achieve better performance by synchronizing the frequencies but anti-synchronizing the phases of the oscillating fields applied to qubits 1 and 2.

Quantum Dipstick

In some examples, the RFQA method could be modified to search for new solutions in a given energy range. For example, a classical method may be used to find a local minimum of the problem Hamiltonian. However, this local minimum may be far from an optimum solution. Thus, to find a better solution, the problem Hamiltonian may be modified by making small adjustments to a large fraction of the various couplers that define it (e.g., the longitudinal interqubit couplings 106(1), 106(2), 106(3), etc., of FIGS. 1 and 2) such that the energy of the initial local minimum is lowered to a new energy (e.g., chosen by the user). If modification of the problem Hamiltonian lowers the energy of the initial state by some amount A, then it can be predicted that that the modification also adjusts the energies of other states by a random amount, which may scale as A divided by the square root of N, where N is the number of terms being adjusted. The transverse fields may then be turned on with oscillations and RFQA may be used to search for other true solutions near in energy to the initial state. Since RFQA does not require exact resonances to achieve a quantum speedup, the system may exhibit a quantum speedup in searching for new, lower energy optima. In contrast, without RFQA, this scheme may perform poorly due to exponentially small resonances.

Additionally or alternatively, the quantum dipstick method may choose the energies of lossy objects (e.g., the lossy elements 320(1)-(9) of FIG. 3) to cool the initial state by known amounts as a different method of finding lower energy configurations.

Figure 6A:
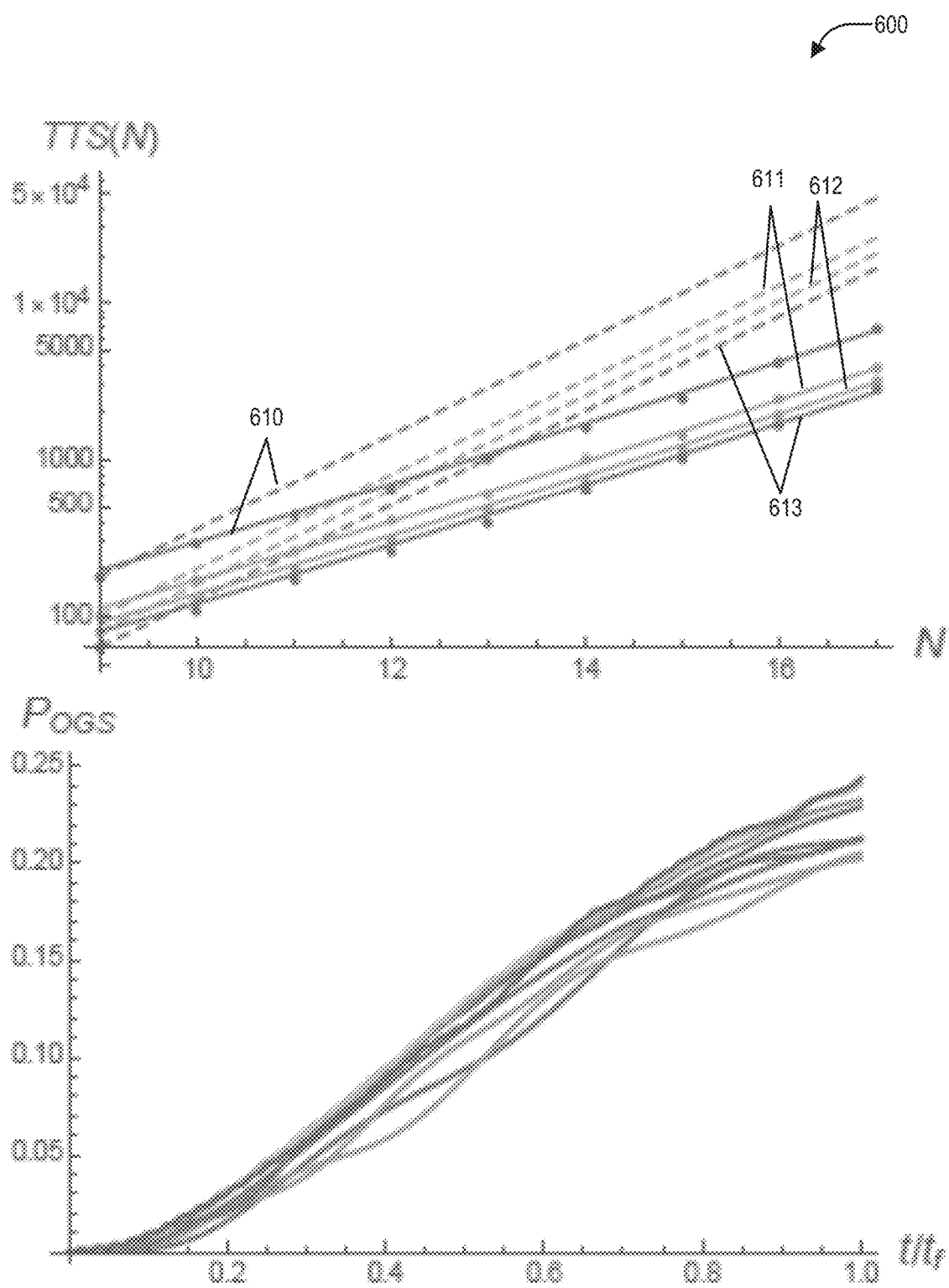
FIG. 6A depicts a graphical representation of a simulated average time to solution (TTS) for the QREM using RFQA, in accordance with embodiments of the disclosure.

Evidence for the efficacy of these ideas can be demonstrated in simulations of a quantum random energy model (QREM). In a QREM, for N bits the time for any classical algorithm to find one of M total solutions (lowest energy states) is $2^N/M$, and when RFQA is incorporated, the quantum algorithm finds solutions in a time that scales roughly as $2^{(0.75 N)}/M$ (e.g., a polynomial quantum speedup). This prediction may be validated by numerical simulations. FIG. 6A depicts a graphical representation 600 of a simulated average time to solution (TTS) for the QREM using RFQA, in accordance with embodiments of the disclosure. The top graph of FIG. 6A depicts an average time to find another ground state in a banded QREM using RFQA, for M=(2; 3; 4; 5) (blue, yellow, green, red) computed from the final success probability for a runtime $t_f=0:56N+0:0092*2^{0.75N}$. The linear portion of the lines correspond to ramping the transverse fields from zero to $K_c$ (e.g., held at constant magnitude for the exponentially long time), with N running from 9 to 17. The dots on the top graph of FIG. 6A correspond to data, and the solid curves correspond to fits to $c_M*2^{0.75N}/N$, with $c_M$ the only free parameter. The fits corresponding to the results depicted in the top graph of FIG. 6A allowed the exponent to vary or removed the polynomial denominator consistently returned a scaling of $2^{(0.75\pm\epsilon)*N}$, with $\epsilon\leq0:06$. The dashed lines on the top graph of FIG. 6A plot $c'_M 2^N$ for comparison purposes. The respective dots, solid curves, and dashed curves associated with each of callouts 610, 611, 612, and 613 correspond to a different respective data set. Since no classical algorithm can find another ground state in less than O ($2^N/M$) time, these results demonstrate a quantum speedup. The top graph of FIG. 6A depicts an example set of traces of success probability vs. time for M=4 total ground states with N running from 9 to 17, The runtimes are rescaled at each N, so curves lying on top of each other represent a quantum speedup.

Figure 6B:
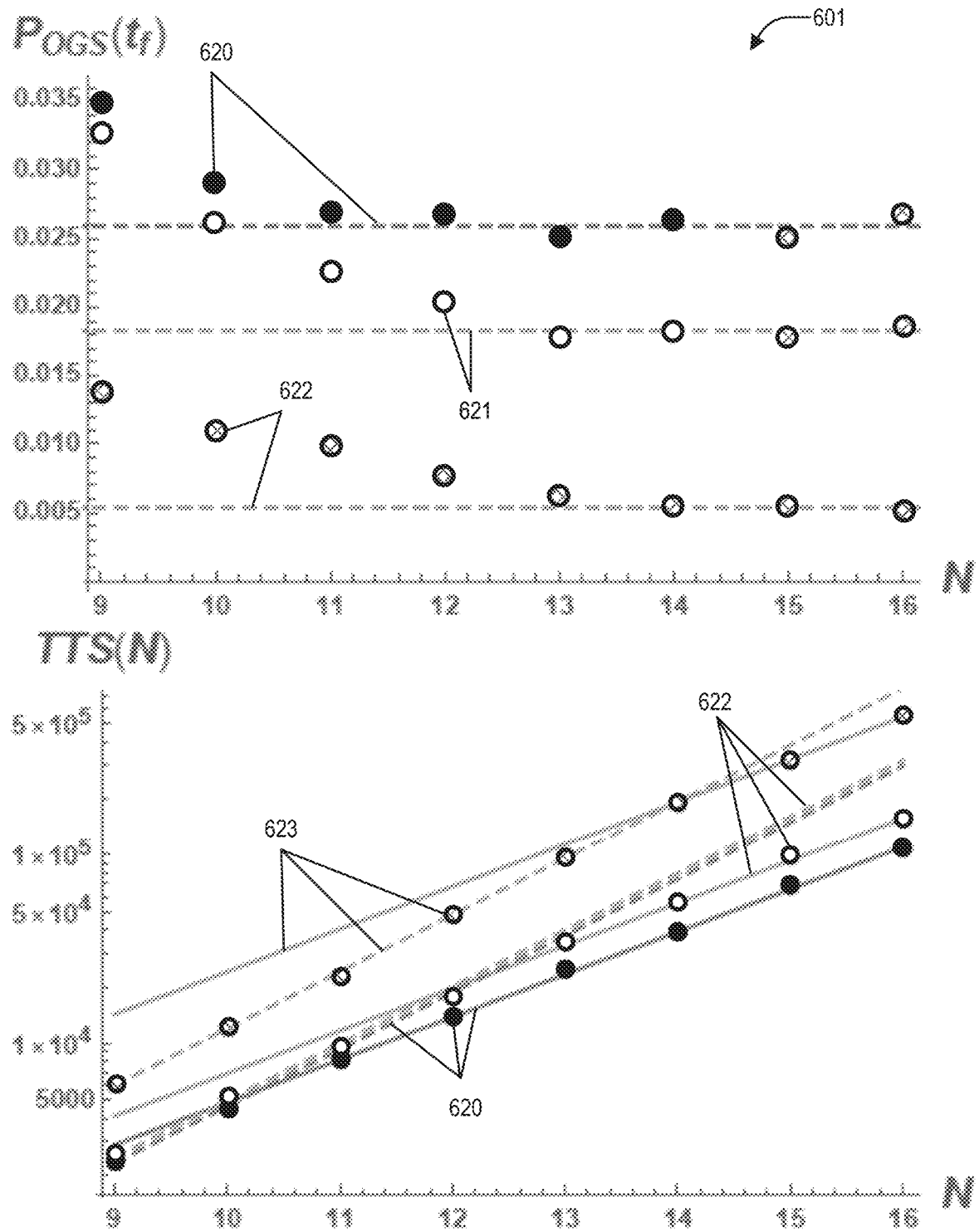
FIG. 6B depicts a graphical representation of a simulated average time to solution for the QREM using RFQA simulation along with the cooling via coupling to an auxiliary degree of freedom, in accordance with embodiments of the disclosure.

FIG. 6B depicts a graphical representation 601 of a simulated average time to solution for the QREM using RFQA simulation along with the cooling via coupling to an auxiliary degree of freedom is used to find solutions previously described. In FIG. 6B, quantum acceleration of bath-assisted phase transitions, the QREM, using RFQA for N running from 9 to 16 with a single auxiliary bath spin. In all three plots 620, 621, and 622 points and curves correspond to a bath spin, which couples to the primary system with a local $\sigma^x$, $\sigma^y$, or $\sigma^z$ operator, respectively. The top graph includes a probability of finding the primary system's true ground state at $t=t_f(N)$. The dashed lines are an average of the final three points. A constant final success probability corresponds to a polynomial quantum speedup relative to classical search algorithms. The bottom graph includes an average TTS as a function of N, taken from the success probability at $t_f(N)$. The solid lines represent $t_s$ of the last three data points to $c_i \times 2^{0.75N}$, and dashed lines extrapolate the classical 2N scaling from N=9.

Figure 7:
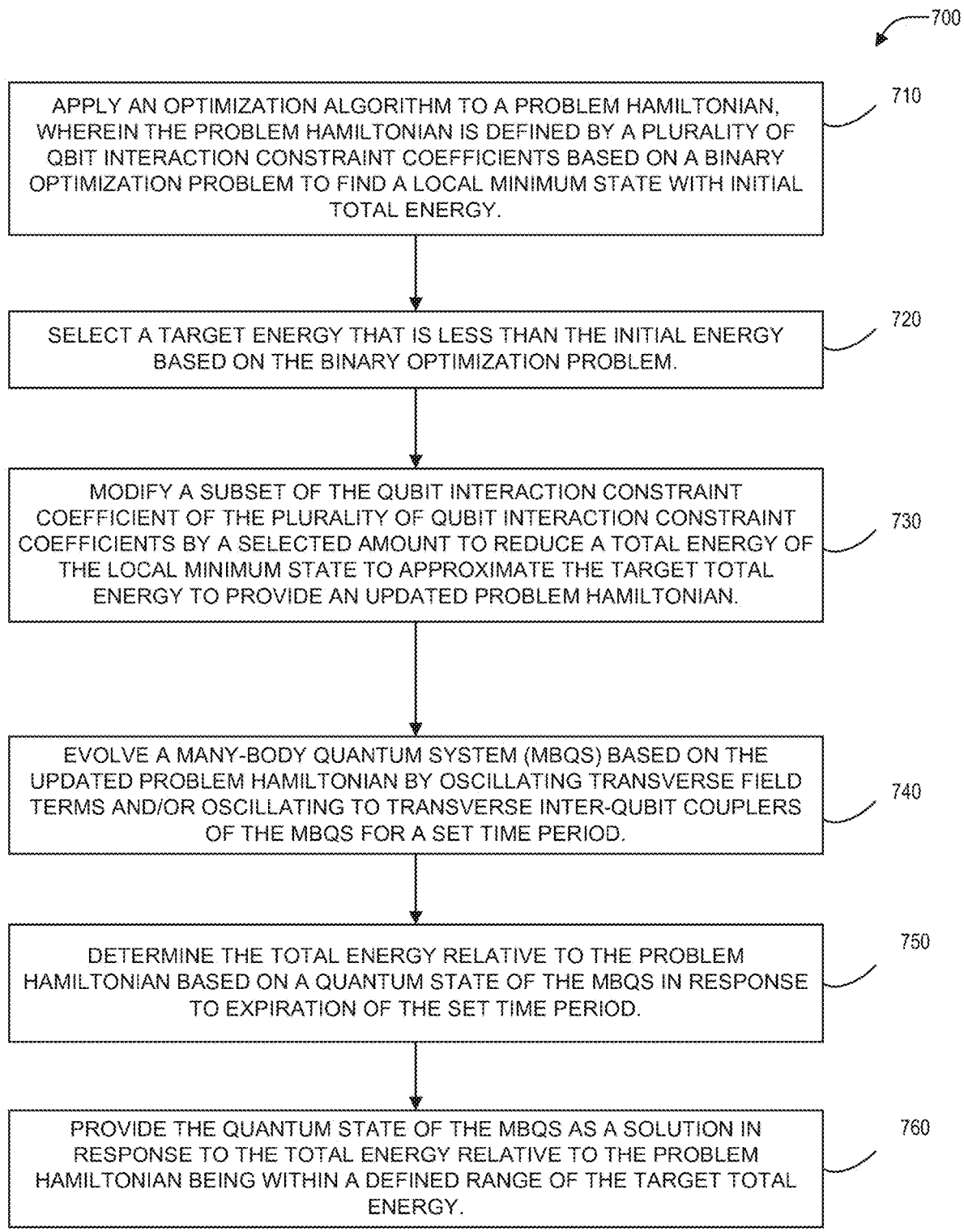
FIG. 7 includes a flowchart depicting a method for implementing RFQA in a MBQS using a quantum dipstick technique, in accordance with embodiments of the disclosure.

FIG. 7 includes a flowchart depicting a method 700 for implementing RFQA in a MBQS using a quantum dipstick technique, in accordance with embodiments of the disclosure. The method 700 may be performed using the MBQS 100 of FIGS. 1 and 2 and/or the MBQS 300 of FIG. 3.

The method 700 may include applying an optimization algorithm to a problem Hamiltonian, at 710. The problem Hamiltonian is defined by a plurality of qubit interaction constraint coefficients based on a binary optimization problem to find a local minimum state with initial total energy. In some examples, the method 700 may include applying oscillations to the transverse fields of the transverse inter-qubit couplings of the MBQS for a set time period including driving the qubits with the oscillating fields according to the driver Hamiltonian so that each of the oscillating fields drives one of the qubits. The method 700 may further include selecting a target energy that is less than the initial energy based on the binary optimization problem, at 720, The method 700 may further include modifying a subset of the qubit interaction constraint coefficient of the plurality of qubit interaction constraint coefficients by a selected amount to reduce a total energy of the local minimum state to approximate the target total energy to provide an updated problem Hamiltonian, at 730.

The method 700 may further include evolving a many-body quantum system (MBQS) based on the updated problem Hamiltonian by applying oscillating fields to single qubit transverse field terms and/or to transverse inter-qubit couplings of the MBQS for a set time period, 740. In some examples, the method 700 may include prior to evolving the MBQS based on the updated problem Hamiltonian, initializing the MBQS by coupling the plurality of qubits to oscillators to provide the oscillating fields applied to the single qubit transverse field terms and/or to the transverse inter-qubit couplings transverse inter-qubit couplings. The transverse inter-qubit couplings may include the transverse inter-qubit couplings 104(1), 104(2), 104(3), etc., of FIGS. 1 and 2 and/or the transverse inter-qubit couplings 104(1)-

(12) of FIG. 3. In some examples, applying oscillations to the single qubit transverse field terms and/or to the transverse inter-qubit couplings of the MBQS for a set time period, which may include driving the qubits with the oscillating fields according to the driver Hamiltonian so that each of the oscillating fields drives one of the qubits. In some examples, the method 700 may further include causing the single qubit transverse field terms and coupling terms of the problem Hamiltonian to experience oscillatory rotations around a common set of axes.

In some examples, the method 700 may further include disabling the oscillating fields applied to the single qubit transverse field terms and/or transverse inter-qubit couplings in response to expiration of the set time period prior to determining the total energy relative to the problem Hamiltonian based on the quantum state of the MBQS. In some examples, disabling the oscillating fields applied to the transverse inter-qubit couplings in response to expiration of the set time period include ramping the disabling the oscillating fields applied to the single qubit transverse field terms and/or to the transverse inter-qubit couplings down to zero strength. Qubits of the MBQS may include the qubits 102(1), 102(2), 102(3), etc., of FIGS. 1 and 2 and/or the qubits 102(1)-(9) of FIG. 3. The oscillating fields may include the oscillating fields 110(1), 110(2), 110(3), etc., of FIGS. 1 and 2 and/or the oscillating fields 110(1)-(9) of FIG. 3 In some examples, the method 700 may further include assigning each of the oscillating fields a common amplitude and a selected frequency and sign. In some examples, the method 700 may further include assigning a randomly-frequency chosen from a range of frequencies to the oscillating fields. The range of frequencies may be determined based on the problem Hamiltonian. In some examples, the method 700 may further include assigning a first frequency to a first oscillating field of the oscillating fields and assigning a second frequency for a second oscillating field of the oscillating fields. In some examples, the method 700 may further include assigning a first frequency to a first group of the oscillating fields and assigning a second frequency to a second group of the oscillating fields. In some examples, the method 700 may further include disabling the oscillating fields applied to the transverse inter-qubit couplings in response to expiration of the set time period prior to determining the total energy relative to the problem Hamiltonian based on the quantum state of the MBQS.

In some examples, the qubits of the MBQS each include a flux qubit having a loop of superconducting wire interrupted by a superconducting quantum interference device (SQUID). In some examples, the method 700 may further include applying the oscillating fields to the single qubit transverse field terms and/or to the transverse inter-qubit couplings of the MBQS for a set time period by driving the qubits transversely to a quantization axis includes threading an oscillating magnetic flux of each of the oscillating fields through the SQUID of a corresponding flux qubit.

In some examples, the qubits of the MBQS each include a flux qubit having a loop of superconducting wire interrupted by a superconducting quantum interference device (SQUID). In some examples, the method 700 may further include applying the oscillating fields to the single qubit transverse field terms and/or to the transverse inter-qubit couplings of the MBQS for a set time period by driving the qubits transversely to a quantization axis by coupling an oscillating voltage across the SQUID of a corresponding flux qubit.

In some examples, evolving the MBQS further includes cooling the MBQS using lossy elements of the MBQS coupled to a subset of the qubits. In some examples, the lossy elements include low-Q superconducting resonators. The lossy elements may include the lossy elements 320(1)-(9) of FIG. 3. In some examples, cooling the MBQS using the lossy elements of the MBQS may include varying effective energies of the lossy elements, exciting lossy degrees of freedom of the lossy elements to add energy to the MBQS, or any combination thereof. In some examples, varying effective energies of the lossy elements may include changing a frequency of parametric couplings to the qubits, adjusting a tunable energy of the lossy elements, or any combination thereof.

In some examples, the method 700 may further include measuring the quantum state of the MBQS after disabling the oscillating fields. The method 700 may further include determining the total energy relative to the problem Hamiltonian based on a quantum state of the MBQS in response to expiration of the set time period, at 750.

The method 700 may further include providing the quantum state of the MBQS as a solution in response to the total energy relative to the problem Hamiltonian being within a defined range of the target total energy, at 760. In some examples, the method 700 may further include, in response to the total energy relative to the problem Hamiltonian being outside of the defined range of the target total energy, repeating the annealing process (evolving step 740, determining step 750, and providing step 760) to get a new energy and compare with the target energy.

Digital Algorithms

One may simulate a MBQS evolution under RFQA, with or without a changing "problem" Hamiltonian, using a digital quantum computer, using one- and two-qubit gates to evolve the state of the MBQS system under an approximation of RFQA.

A cooling scheme for digital quantum evolution may be implemented with RFQA. Specifically, if some fraction of the qubits are reserved ("reserved qubits") as ancillas (e.g., are not part of the main problem Hamiltonian), the reserved qubits may be used as cooling resources by assigning them relatively high "energies" in the digital evolution. The high "energies" may vary in a range during the digital evolution, in some examples. In other examples, the high "energies" may remain constant during the digital evolution. The reserve qubits may be coupled comparatively weakly to the "primary" qubits. The reserve qubits may be initialized to a ground (e.g., logical |0⟩) states, such that the |1⟩ state is an "excited" state. In this scenario, cooling may be accomplished by periodically resetting the states of the reserved qubits to logical |0⟩, removing excitations from the primary system and thus lowering the "energy" of the digital simulation. This cooling scheme could be incorporated into any digital implementation of RFQA (e.g., for machine learning, optimization, some other purpose, or any combination thereof).

Figure 8:
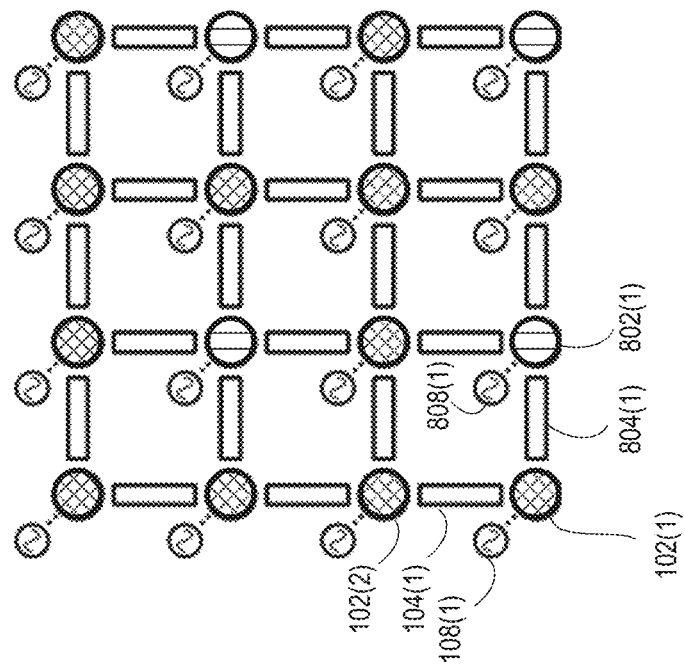
FIG. 8 includes an example layout of a MBQS system that includes reserve qubits in accordance with embodiments of the disclosure.

FIG. 8 includes an example layout of a MBQS system 800 that includes reserve qubits 804(1)-(4) in accordance with embodiments of the disclosure. The MBQS 800 may include elements that have been previously described with respect to the MBQS 100 of FIGS. 1 and/or 2. Those elements have been identified in FIG. 8 using the same reference numbers used in FIGS. 1 and/or 2 and operation of the common elements is as previously described. Consequently, a detailed description of the operation of these particular elements will not be repeated in the interest of brevity.

The primary qubits 102(1)-(12) are represented by the blue circles, the reserve qubits 802(1)-(4) are represented by the black circles, the oscillators 108(1)-(12) and 808(1)-(4) are represented by the circles, the oscillating fields are represented by the dashed lines connected to the qubits 102(1)-(9), the transverse interqubit couplings 104(1)-(12) and 804(1)-(12) are represented by the rectangles. The reserve qubits 802(1)-(4) may be assigned relatively large "energies" in the digital evolution and periodically reset for optimization and error correction. Otherwise, the reserve qubits 802(1)-(4) may operate as ordinary primary qubits along with the primary qubits 104(1)-(12). If every one of the qubits 104(1)-(12) and 802(1)-(4) has a fast reset capability, various layouts could be implemented. In some examples, a number of reserve qubits used for cooling and error correction may be a constant fraction of a total number of qubits in the MBQS (e.g., ¼ as shown in FIG. 8, ⅓, ⅕, ⅛, etc.).

An example of implementation of digital quantum evolution using reserve qubit cooling may be as follows. If an algorithm evolves the state $|\psi\rangle$ of the "primary" qubits 104(1)-(12) under a time-dependent Hamiltonian $H_P(t)$ (Note that the time t may be an abstract parameter used to track the system's evolution), when simulating RFQA, $H_P(t)$ would be the sum of a spin glass Hamiltonian along z and a collection of transverse fields that oscillate with t. This may be done by enacting layers of one- and two-qubit gates, such that $|\psi\rangle \rightarrow \exp i (H_P(t)\Delta t)|\psi\rangle$. If the energy scale of this Hamiltonian is J, then in general $J\Delta t<1$. At the same time, the states of the reserve qubits A rotate according to their assigned energies (e.g., may or may not vary with time),
$|\psi\rangle \rightarrow \exp i (\Sigma_{j=1}^{N_A} \sigma_{iA}^z \omega_{iA}(t)\Delta t)|\psi\rangle$.

Then, sequences of two-qubit gates may be applied to weakly couple the primary qubits 102(1)-(12) to the reserve qubits 802(1)-(4) (e.g., via the transverse interqubit couplings 804(1)-(12)), where each of these gates acts with a single qubit operator on a primary qubit and a $\sigma_{iA}^x$ or $\sigma_{iA}^y$ on a reserve qubit. As these gates are meant to approximate weak couplings, they are likely to be relatively small rotations. Considering a single pair of qubits with the operation
$|\psi\rangle \rightarrow \exp i (\Omega_i \sigma_i^x \sigma_{iA}^x \Delta t)|\psi\rangle$, it may be expected that $\Omega \ll J$. A rough estimate for a 2d lattice of N total qubits suggests $\Omega \propto J/\sqrt{N}$, but other scaling forms may be applicable depending on the algorithm. A layer of reset operations [R] may then be applied. The reset operations may be applied randomly with some predetermined rate to each reserve qubit 802(1)-(4), or once every k timesteps for some chosen k for each reserve qubit. It is not expected that the reserve qubits 802(1)-(4) would be to be reset at the end of every timestep. In some examples, the reset probability per timestep may be set to be proportional to $|\Omega \Delta t|$, but other scaling and strategies may also be possible. In total, for each timestep $\Delta t$, the sequence of operations (applied right to left) may include:

$$|\psi\rangle \rightarrow [R] \exp\left(i\left(\sum_{jk} \Omega_{jk}(t)\sigma_j^{x,y,z}\sigma_{kA}^x \Delta t\right)\right)$$
$$\exp\left(i\left(\sum_{j=1}^{N_A} \sigma_{iA}^z \omega_{iA}(t)\Delta t\right)\right) \exp i(H_P(t)\Delta t) |\psi\rangle$$

This algorithm may be run for a set number of timesteps, followed by measuring the primary qubits 102(1)-(12) to determine the final "energy" in an optimization problem, the statistical distance from an output distribution for a machine learning problem, etc., or any combination thereof.

Note that if the gate error rate is below a threshold (e.g., determined based on application), then the algorithm may maintain a quantum speedup at arbitrarily high gate depth, since the cooling reserve qubits may act as an error correction mechanism and at least partially offset the influence of random gate errors (e.g., which are a local "heating" source). Note also that with some variant or approximation of RFQA included in the primary system's evolution, the cooling scheme may be more likely to produce a quantum speedup than if it is absent.

The frequent resets of the reserve qubits may be used for digital cooling, for approximating RFQA, for sampling the output of such a sequence for machine learning applications, etc., or any combination thereof. In some examples, a digital implementation to approximate RFQA may include oscillating, in time, the transverse fields (e.g., the transverse interqubit couplings 104(1)-(12) and 804(1)-(12)), the problem Hamiltonian, or both. The transverse interqubit couplings 104(1)-(12) and 804(1)-(12) may oscillate in type, magnitude, etc., or any combination thereof.

In particular, if the transverse field is defined to be along the x axis, and the problem Hamiltonian is defined to be along the z axis, the RFQA-D method described with reference to in FIGS. 6A and 6B includes the transverse field terms oscillations in an xy plane. This could be implemented in flux qubits using applied electric fields. However, in digital evolution, it may be beneficial to rotate both the transverse field and the problem Hamiltonian terms around a common axis using the RFQA prescription. For example, the spin operators for each qubit in the total Hamiltonian of the MBQS (including both the transverse field and problem Hamiltonian) could all rotate around the y axis (e.g., transverse field terms rotate between X and Z and problem Hamiltonian operators rotate between X and Z), by adding layers of local y rotations before and after the layers which apply the transverse field and problem Hamiltonians. If each of these layers of y rotations rotates the effective Hamiltonian as if each the quantization axis of each qubit were oscillating with a chosen amplitude, frequency and phase, then a new form of RFQA is implemented which may find solutions more quickly for reasons similar to other RFQA methods. This variant of RFQA, where both transverse field and problem Hamiltonian terms experience independent oscillatory rotations, may be easier to implement in a digital simulation, but could be implemented in an analog implementation (e.g., if the qubits have both transverse and longitudinal coupling terms).

Because RFQA accelerates multiqubit tunneling and "thermalization" (e.g., a neural network reaching an equilibrium state), it may be used to accelerate machine learning as well. In some machine learning applications, thermalization is a key bottleneck. Thus, the RFQA method could be applied to existing quantum machine learning systems to improve performance.

Figure 9:
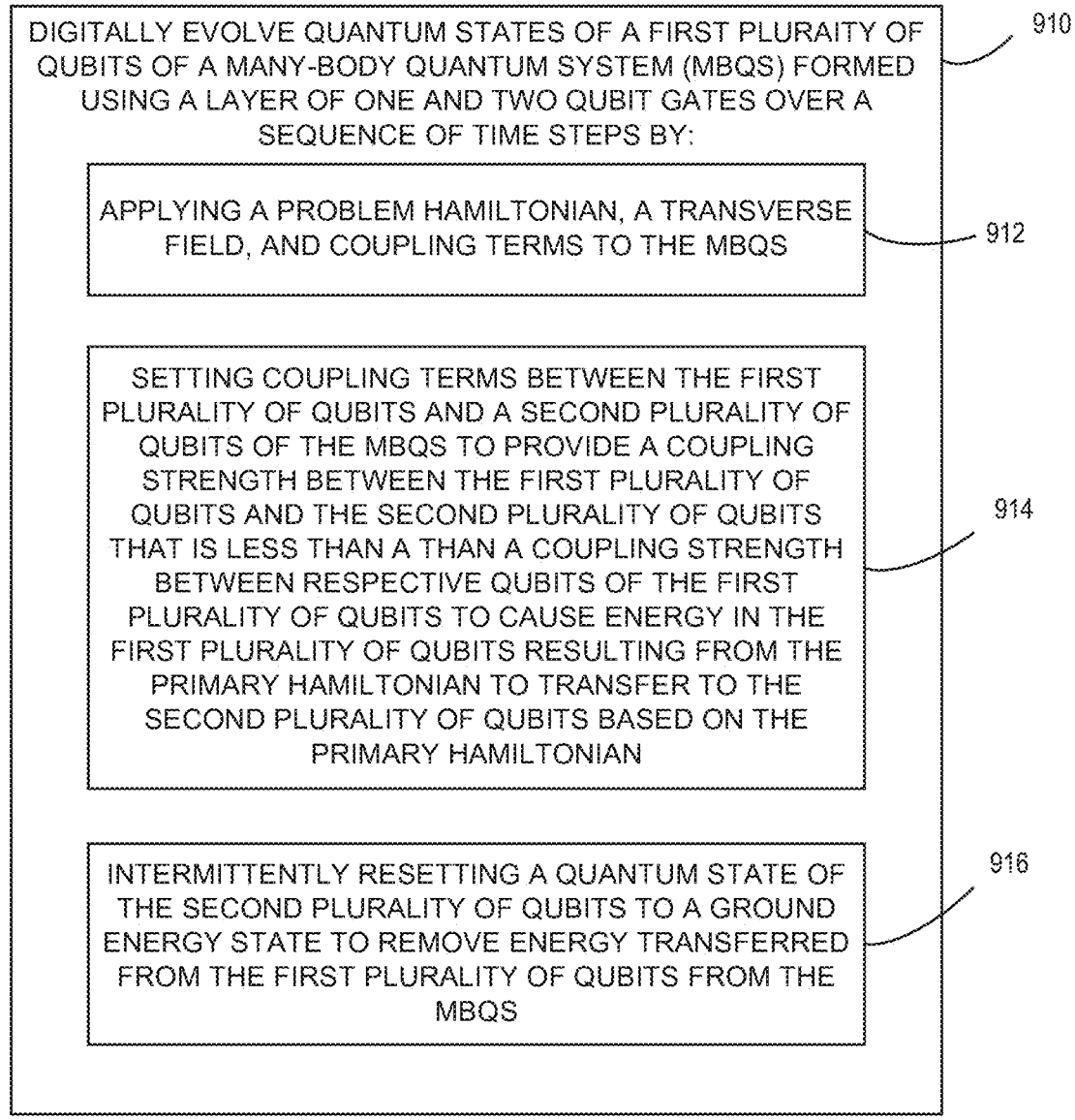
FIG. 9 includes a flowchart depicting a method for implementing RFQA in a MBQS with digital evolution, in accordance with embodiments of the disclosure.

FIG. 9 includes a flowchart depicting a method 900 for implementing RFQA in a MBQS with digital evolution, in accordance with embodiments of the disclosure. The method 900 may be performed using the MBQS 100 of FIGS. 1 and 2, the MBQS 300 of FIG. 3, the MBQS 800 of FIG. 8, or any combination thereof.

The method 900 may include digitally evolving quantum states of a first plurality of qubits of a many-body quantum system (MBQS) formed using a layer of one and two qubit gates over a sequence of time steps by, at 910. The digital evolution may include applying a problem Hamiltonian, a transverse field, and coupling terms to the MBQS, at 912. In some examples, the digital evolution of the method 900 may further include independently oscillating the transverse fields in magnitude, direction, or any combination thereof for each time step of the sequence of time steps. The oscillations may be performing by applying oscillating fields to the transverse fields, such as the oscillating fields 110(1), 110(2), 110(3), etc., of FIGS. 1 and 2, the oscillating fields 110(1)-(9) of FIG. 3, and/or the dotted oscillating field lines of FIG. 8. In some examples, the oscillations of the transverse fields approximates prescriptions of one or more of any of the RFQA method(s) described herein. In some examples, the digital evolution may further include causing the transverse field terms and the coupling terms of the problem Hamiltonian to experience oscillatory rotations around a common set of axes. In some examples, amplitudes, frequencies, and phases of the experienced oscillatory rotations are synchronized based on terms of the problem Hamiltonian.

The digital evolution may further include setting coupling terms between the first plurality of qubits and a second plurality of qubits of the MBQS to provide a coupling strength between the first plurality of qubits and the second plurality of qubits that is less than a than a coupling strength between respective qubits of the first plurality of qubits, at 914. The lower coupling strength may cause energy in the first plurality of qubits resulting from the primary Hamiltonian to transfer to the second plurality of qubits based on the primary Hamiltonian. The first and second plurality of qubits may include a combination of the qubits 102(1), 102(2), 102(3), etc., of FIGS. 1 and 2, the qubits 102(1)-(9) of FIG. 3, the primary qubits 102(1)-12) and reserve qubits 804(1)-(4) of FIG. 8, or any combination thereof. In some examples, energy of each of the second plurality of qubits and/or the defined range is selected based on respective coupling terms of the primary Hamiltonian acting on the first plurality of qubits.

The digital evolution may further include intermittently resetting a quantum state of the second plurality of qubits to a ground energy state to remove energy transferred from the first plurality of qubits from the MBQS, at 916. A count of the first plurality of qubits may be greater than a count of the second plurality of qubits. In some examples, the digital evolution may further include intermittently resetting the quantum state of the second plurality of qubits to the ground energy state at each time step of the sequence of time steps.

In some examples, the digital evolution may further include intermittently resetting the quantum state of the second plurality of qubits to the ground energy state after every N time steps of the sequence of time steps.

In some examples, the digital evolution may further include intermittently resetting the quantum state of the second plurality of qubits to the ground energy state independent of timing of the sequence of time steps. In some examples, the random interval is asynchronous with timing of the sequence of time steps. In some examples, the random interval is synchronous with timing of the sequence of time steps.

In some examples, the digital evolution may further include intermittently resetting the quantum state of the second plurality of qubits to the ground energy state at a random interval.

In some examples, the method 900 may further include resetting a first qubit of the second subset of qubits at a first time and resetting a second qubit of the second subset of qubits at a second time. In some examples, the reset schedule is periodic. In some examples, the method 900 may further include assigning each of the oscillating fields a common amplitude and a selected frequency and sign. In some examples, the method 900 may further include assigning a randomly-frequency chosen from a range of frequencies to the oscillating fields. The range of frequencies may be determined based on the problem Hamiltonian. In some examples, the method 900 may further include assigning a first frequency to a first oscillating field of the oscillating fields and assigning a second frequency for a second oscillating field of the oscillating fields. In some examples, the method 900 may further include assigning a first frequency to a first group of the oscillating fields and assigning a second frequency to a second group of the oscillating fields.

In some examples, the qubits of the MBQS under digital evolution are superconducting qubits, e.g., flux qubits, transmon qubits, or other superconducting devices controllable with a series of digital pulses.

In some examples, the qubits of the MBQS under digital evolution are trapped ion or neutral atom qubits controllable with a series of digital pulses. In some examples, a digital quantum computing system with a full one- and two-qubit gate set and an ability to perform reset operations could be used to implement ideas described herein.

In some examples, evolving the MBQS based on the problem Hamiltonian further includes cooling the MBQS using lossy elements of the MBQS coupled to a subset of the qubits. In some examples, the lossy elements include low-Q superconducting resonators. The lossy elements may include the lossy elements 320(1)-(9) of FIG. 3. In some examples, cooling the MBQS using the lossy elements of the MBQS may include varying effective energies of the lossy elements, exciting lossy degrees of freedom of the lossy elements to add energy to the MBQS, or any combination thereof. In some examples, varying effective energies of the lossy elements may include changing a frequency of parametric couplings to the qubits, adjusting a tunable energy of the lossy elements, or any combination thereof.

The method 900 may further include, in response to expiration of the sequence of time steps, decoupling the first subset of qubits from the oscillating fields that drive the first subset of qubits according to the driver Hamiltonian, at 920. In some examples, the method 900 further includes measuring a statistical distance based on a quantum state of the MBQS after decoupling the first subset of qubits from the oscillating fields for a machine learning algorithm. In some examples, the method 900 further includes measuring an energy of the MBQS based on a quantum state of the MBQS after decoupling the first subset of qubits from the oscillating fields for an optimization algorithm.

In some examples, the energy state of the second plurality of qubits is chosen such that evolution of the quantum states of the first plurality of qubits is driven toward configurations with lower energy in an optimization application or such that an output distribution of the quantum states of the primary qubits approximates a target distribution in a machine learning application.

In some examples, digital evolution of the quantum states of the first plurality of qubits is directed to optimization, machine learning, or any other purpose described herein.

EXAMPLES

Example 1 is a method, comprising: applying an optimization algorithm to a problem Hamiltonian, wherein the problem Hamiltonian is defined by a plurality of qubit interaction constraint coefficients based on a binary optimization problem to find a local minimum state with initial total energy; selecting a target energy that is less than the initial energy based on the binary optimization problem; modifying a subset of the qubit interaction constraint coefficient of the plurality of qubit interaction constraint coefficients by a selected amount to reduce a total energy of the local minimum state to approximate the target total energy to provide an updated problem Hamiltonian; evolving a many-body quantum system (MBQS) based on the updated problem Hamiltonian by applying oscillating fields to single qubit transverse field terms and/or to transverse inter-qubit couplings of the MBQS for a set time period; determining the total energy relative to the problem Hamiltonian based on a quantum state of the MBQS in response to expiration of the set time period; and providing the quantum state of the MBQS as a solution in response to the total energy relative to the problem Hamiltonian being within a defined range of the target total energy.

In Example 2, the subject matter of Example 1 includes, disabling the oscillating fields applied to the single qubit transverse field terms and/or to the transverse inter-qubit couplings in response to expiration of the set time period prior to determining the total energy relative to the problem Hamiltonian based on the quantum state of the MBQS.

In Example 3, the subject matter of Example 2 includes, measuring the quantum state of the MBQS after disabling the oscillating fields.

In Example 4, the subject matter of Examples 2-3 includes, wherein disabling the oscillating fields applied to the single qubit transverse field terms and/or to the transverse inter-qubit couplings in response to expiration of the set time period include ramping the disabling the oscillating fields applied to the transverse inter-qubit couplings down to zero strength.

In Example 5, the subject matter of Examples 1-4 includes, in response to the total energy relative to the problem Hamiltonian being outside of the defined range of the target total energy: evolving the MBQS based on the updated problem Hamiltonian by applying the oscillating fields to the single qubit transverse field terms and/or to the transverse inter-qubit couplings of the MBQS for a second set time period; determining a second total energy relative to the problem Hamiltonian based on a second quantum state of the MBQS in response to expiration of the second set time period; and providing the second quantum state of the MBQS as a solution in response to the second total energy relative to the problem Hamiltonian being within the defined range of the target total energy.

In Example 6, the subject matter of Examples 1-5 includes, prior to evolving the MBQS based on the updated problem Hamiltonian, initializing the MBQS by coupling the plurality of qubits to oscillators to provide the oscillating fields applied to the single qubit transverse field terms and/or to the transverse inter-qubit couplings.

In Example 7, the subject matter of Examples 1-6 includes, wherein applying oscillations to the single qubit transverse field terms and/or to the transverse inter-qubit couplings of the MBQS for a set time period including driving the qubits with the oscillating fields according to the driver Hamiltonian so that each of the oscillating fields drives one of the qubits.

In Example 8, the subject matter of Examples 1-7 includes, determining the plurality of qubit interaction constraint coefficients based on the binary optimization problem.

In Example 9, the subject matter of Examples 1-8 includes, assigning each of the oscillating fields a common amplitude and a selected frequency and sign.

In Example 10, the subject matter of Example 9 includes, assigning a randomly-frequency chosen from a range of frequencies to the oscillating fields.

In Example 11, the subject matter of Example 10 includes, wherein the range of frequencies is determined based on the problem Hamiltonian.

In Example 12, the subject matter of Examples 9-11 includes, assigning a first frequency to a first oscillating field of the oscillating fields and assigning a second frequency for a second oscillating field of the oscillating fields.

In Example 13, the subject matter of Examples 9-12 includes, assigning a first frequency to a first group of the oscillating fields and assigning a second frequency to a second group of the oscillating fields.

In Example 14, the subject matter of Examples 1-13 includes, wherein qubits of the MBQS each include a flux qubit having a loop of superconducting wire interrupted by a superconducting quantum interference device (SQUID).

In Example 15, the subject matter of Example 14 includes, wherein applying oscillating fields to the single qubit transverse field terms and/or to the transverse inter-qubit couplings of the MBQS for a set time period includes driving the qubits transversely to a quantization axis includes threading an oscillating magnetic flux of each of the oscillating fields through the SQUID of a corresponding flux qubit.

In Example 16, the subject matter of Examples 1-15 includes, wherein qubits of the MBQS each include a flux qubit having a loop of superconducting wire interrupted by a superconducting quantum interference device (SQUID).

In Example 17, the subject matter of Example 16 includes, wherein applying osci
llating fields to the single qubit transverse field terms and/or to the transverse inter-qubit couplings of the MBQS for a set time period includes driving the qubits transversely to a quantization axis by coupling an oscillating voltage across the SQUID of a corresponding flux qubit.

In Example 18, the subject matter of Examples 1-17 includes, wherein evolving the MBQS further includes cooling the MBQS using lossy elements of the MBQS coupled to a subset of the qubits.

In Example 19, the subject matter of Examples 1-18 includes, causing the single qubit transverse field terms and coupling terms of the problem Hamiltonian to experience oscillatory rotations around a common set of axes.

Example 20 is a method, comprising: defining a problem Hamiltonian having a plurality of qubit interaction constraint coefficients based on random samples of a dataset using a heuristic technique; initializing a quantum state of a many-body quantum system (MBQS) to a first state chosen from the dataset defined by a driver Hamiltonian; iteratively repeat until a new dataset has a predetermined number of samples: evolving the MBQS based on the problem Hamiltonian by applying oscillating fields of the driver Hamiltonian to single qubit transverse field terms and/or to transverse inter-qubit couplings of the MBQS for a set time period; measuring the quantum state of the MBQS in response to expiration of the set time period; adding the measured quantum state as a new sample to the new dataset; and re-initializing the quantum state of the MBQS to a next state chosen from the dataset or the measured quantum state defined by the driver Hamiltonian; updating at least one of the plurality of qubit interaction constraint coefficients based on correlations within the new data set and a statistical distance between the dataset and the new dataset to provide an updated problem Hamiltonian.

In Example 21, the subject matter of Example 20 includes, in response to the statistical distance being below a defined threshold, using the MBQS to generate a second new dataset using the updated problem Hamiltonian.

In Example 22, the subject matter of Examples 20-21 includes, disabling the oscillating fields applied to the single qubit transverse field terms and/or to the transverse inter-qubit couplings in response to expiration of the set time period prior to measuring the quantum state of the MBQS.

In Example 23, the subject matter of Examples 20-22 includes, wherein the predetermined number of samples is based on a count of qubits of the MBQS.

In Example 24, the subject matter of Examples 20-23 includes, wherein the statistical distance includes a Kullback-Liebler divergence.

In Example 25, the subject matter of Examples 20-24 includes, wherein a count of qubits is at least as great as a count of bits of a sample of the dataset.

In Example 26, the subject matter of Examples 20-25 includes, wherein the MBQS includes a first subset of qubits that correspond to bits of the random samples of the dataset and a second subset of qubits that correspond to correlations between the bits of the random samples.

In Example 27, the subject matter of Examples 20-26 includes, wherein applying the oscillating fields to the single qubit transverse field terms and/or to the transverse inter-qubit couplings of the MBQS for a set time period including driving the qubits with the oscillating fields according to the driver Hamiltonian so that each of the oscillating fields drives one of the qubits.

In Example 28, the subject matter of Examples 20-27 includes, assigning each of the oscillating fields a common amplitude and a selected frequency and sign.

In Example 29, the subject matter of Example 28 includes, assigning a randomly-frequency chosen from a range of frequencies to the oscillating fields.

In Example 30, the subject matter of Example 29 includes, wherein the range of frequencies is determined based on the problem Hamiltonian.

In Example 31, the subject matter of Examples 28-30 includes, assigning a first frequency to a first oscillating field of the oscillating fields and assigning a second frequency for a second oscillating field of the oscillating fields.

In Example 32, the subject matter of Examples 28-31 includes, assigning a first frequency to a first group of the oscillating fields and assigning a second frequency to a second group of the oscillating fields.

In Example 33, the subject matter of Examples 20-32 includes, wherein qubits of the MBQS each include a flux qubit having a loop of superconducting wire interrupted by a superconducting quantum interference device (SQUID).

In Example 34, the subject matter of Example 33 includes, wherein applying oscillating fields to the single qubit transverse field terms and/or to the transverse inter-qubit couplings of the MBQS for a set time period includes driving the qubits transversely to a quantization axis includes threading an oscillating magnetic flux of each of the oscillating fields through the SQUID of a corresponding flux qubit.

In Example 35, the subject matter of Examples 20-34 includes, wherein qubits of the MBQS each include a flux qubit having a loop of superconducting wire interrupted by a superconducting quantum interference device (SQUID).

In Example 36, the subject matter of Example 35 includes, wherein applying oscillating fields to the single qubit transverse field terms and/or to the transverse inter-qubit couplings of the MBQS for a set time period includes driving the qubits transversely to a quantization axis by coupling an oscillating voltage across the SQUID of a corresponding flux qubit.

In Example 37, the subject matter of Examples 20-36 includes, wherein evolving the MBQS includes cooling the MBQS using lossy elements of the MBQS coupled to a subset of the qubits.

In Example 38, the subject matter of Examples 20-37 includes, causing the transverse field terms and the coupling terms of the problem Hamiltonian to experience oscillatory rotations around a common set of axes.

Example 39 is a method, comprising: digitally evolving quantum states of a first plurality of qubits of a many-body quantum system (MBQS) formed using a layer of one and two qubit gates over a sequence of time steps by: applying a problem Hamiltonian, a transverse field, and coupling terms to the MBQS; setting coupling terms between the first plurality of qubits and a second plurality of qubits of the MBQS to provide a coupling strength between the first plurality of qubits and the second plurality of qubits that is less than a than a coupling strength between respective qubits of the first plurality of qubits to cause energy in the first plurality of qubits resulting from the primary Hamiltonian to transfer to the second plurality of qubits based on the primary Hamiltonian; and intermittently resetting a quantum state of the second plurality of qubits to a ground energy state to remove energy transferred from the first plurality of qubits from the MBQS.

In Example 40, the subject matter of Example 39 includes, independently oscillating the transverse fields in magnitude, direction, or any combination thereof for each time step of the sequence of time steps.

In Example 41, the subject matter of Example 40 includes, wherein the oscillations of the transverse fields approximates prescriptions of one or more of any of the RFQA method(s) described herein.

In Example 42, the subject matter of Examples 39-41 includes, wherein energy of each of the second plurality of qubits vary over time within a predefined range to remove energy from the first plurality of qubits.

In Example 43, the subject matter of Examples 39-42 includes, wherein energy of each of the second plurality of qubits and/or the defined range is selected based on respective coupling terms of the primary Hamiltonian acting on the first plurality of qubits.

In Example 44, the subject matter of Examples 39-43 includes, causing the transverse field terms and the coupling terms of the problem Hamiltonian to experience oscillatory rotations around a common set of axes.

In Example 45, the subject matter of Examples 39-44 includes, wherein amplitudes, frequencies, and phases of the experienced oscillatory rotations are synchronized based on terms of the problem Hamiltonian.

In Example 46, the subject matter of Examples 39-45 includes, intermittently resetting the quantum state of the second plurality of qubits to the ground energy state at each time step of the sequence of time steps.

In Example 47, the subject matter of Examples 39-46 includes, intermittently resetting the quantum state of the second plurality of qubits to the ground energy state after every N time steps of the sequence of time steps.

In Example 48, the subject matter of Examples 39-47 includes, intermittently resetting the quantum state of the second plurality of qubits to the ground energy state independent of timing of the sequence of time steps.

In Example 49, the subject matter of Examples 39-48 includes, intermittently resetting the quantum state of the second plurality of qubits to the ground energy state at a random interval.

In Example 50, the subject matter of Example 49 includes, wherein the random interval is asynchronous with timing of the sequence of time steps.

In Example 51, the subject matter of Examples 49-50 includes, wherein the random interval is synchronous with timing of the sequence of time steps.

In Example 52, the subject matter of Examples 39-51 includes, wherein the energy state of the second plurality of qubits is chosen such that evolution of the quantum states of the first plurality of qubits is driven toward configurations with lower energy in an optimization application or such that an output distribution of the quantum states of the primary qubits approximates a target distribution in a machine learning application.

In Example 53, the subject matter of Examples 39-52 includes, wherein digital evolution of the quantum states of the first plurality of qubits is directed to optimization, machine learning, or any other purpose described herein.

In Example 54, the subject matter of Examples 39-53 includes, wherein a count of the first plurality of qubits is greater than a count of the second plurality of qubits.

In Example 55, the subject matter of Examples 39-54 includes, resetting a first qubit of the second plurality of qubits at a first time and resetting a second qubit of the second plurality of qubits at a second time.

Example 56 is a method, comprising: evolving a many-body quantum system (MBQS) based on the problem Hamiltonian for a predetermined period of time by: coupling qubits of the MBQS to oscillating fields that drive the qubits according to a driver Hamiltonian, wherein the oscillating fields drive a plurality of transitions of the qubits; coupling the qubits to each other according to a problem Hamiltonian; and cooling the MBQS using lossy elements of the MBQS coupled to a subset of the qubits; and in response to expiration of the predetermined time period, decoupling the qubits from the oscillating fields that drive the qubits according to the driver Hamiltonian.

In Example 57, the subject matter of Example 56 includes, wherein cooling the MBQS using the lossy elements of the MBQS comprises varying effective energies of the lossy elements.

In Example 58, the subject matter of Example 57 includes, wherein varying effective energies of the lossy elements includes changing a frequency of parametric couplings to the qubits.

In Example 59, the subject matter of Examples 57-58 includes, wherein varying effective energies of the lossy elements includes adjusting a tunable energy of the lossy elements.

In Example 60, the subject matter of Examples 56-59 includes, wherein cooling the MBQS using the lossy elements of the MBQS comprises exciting lossy degrees of freedom of the lossy elements to add energy to the MBQS.

In Example 61, the subject matter of Examples 56-60 includes, measuring a statistical distance based on a quantum state of the MBQS after decoupling the qubits from the oscillating fields for a machine learning algorithm.

In Example 62, the subject matter of Examples 56-61 includes, measuring an energy of the MBQS based on a quantum state of the MBQS after decoupling the qubits from the oscillating fields for an optimization algorithm.

In Example 63, the subject matter of Examples 56-62 includes, applying the oscillating fields to single qubit transverse field terms and/or to transverse inter-qubit couplings of the MBQS for a set time period.

In Example 64, the subject matter of Examples 56-63 includes, assigning each of the oscillating fields a common amplitude and a selected frequency and sign.

In Example 65, the subject matter of Example 64 includes, assigning a randomly-frequency chosen from a range of frequencies to the oscillating fields.

In Example 66, the subject matter of Example 65 includes, wherein the range of frequencies is determined based on the problem Hamiltonian.

In Example 67, the subject matter of Examples 64-66 includes, assigning a first frequency to a first oscillating field of the oscillating fields and assigning a second frequency for a second oscillating field of the oscillating fields.

In Example 68, the subject matter of Examples 64-67 includes, assigning a first frequency to a first group of the oscillating fields and assigning a second frequency to a second group of the oscillating fields.

In Example 69, the subject matter of Examples 56-68 includes, wherein the lossy elements include low-Q superconducting resonators.

In Example 70, the subject matter of Example 69 includes, wherein the qubits of the MBQS each include a flux qubit having a loop of superconducting wire interrupted by a superconducting quantum interference device (SQUID).

In Example 71, the subject matter of Example 70 includes, applying the oscillating fields to single qubit transverse field terms and/or to transverse inter-qubit couplings of the MBQS for a set time period by driving the qubits transversely to a quantization axis includes threading an oscillating magnetic flux of each of the oscillating fields through the SQUID of a corresponding flux qubit.

In Example 72, the subject matter of Examples 69-71 includes, wherein the qubits of the MBQS each include a flux qubit having a loop of superconducting wire interrupted by a superconducting quantum interference device (SQUID).

In Example 73, the subject matter of Example 72 includes, applying the oscillating fields to single qubit transverse field terms and/or to transverse inter-qubit couplings of the MBQS for a set time period by driving the qubits transversely to a quantization axis by coupling an oscillating voltage across the SQUID of a corresponding flux qubit.

In Example 74, the subject matter of Examples 56-73 includes, causing transverse field terms and coupling terms of the problem Hamiltonian to experience oscillatory rotations around a common set of axes.

Example 75 is at least one machine-readable medium including instructions that, when executed by processing circuitry, cause the processing circuitry to perform operations to implement of any of Examples 1-74.

Example 76 is an apparatus configured to implement of any of Examples 1-74.

Example 77 is a system configured to implement of any of Examples 1-74.

From the foregoing it will be appreciated that, although specific embodiments of the disclosure have been described herein for purposes of illustration, various modifications may be made without deviating from the spirit and scope of the disclosure. Accordingly, the disclosure is not limited except as by the appended claims.

The invention claimed is:

1. A method, comprising:
applying an optimization algorithm to a problem Hamiltonian, wherein the problem Hamiltonian is defined by a plurality of qubit interaction constraint coefficients based on a binary optimization problem to find a local minimum state with initial total energy;
selecting a target total energy that is less than the initial total energy based on the binary optimization problem;
modifying a subset of the qubit interaction constraint coefficient of the plurality of qubit interaction constraint coefficients by a selected amount to reduce a total energy of the local minimum state to approximate the target total energy to provide an updated problem Hamiltonian;
evolving a many-body quantum system (MBQS) based on the updated problem Hamiltonian by applying oscillating fields to single qubit transverse field terms and/or to transverse inter-qubit couplings of the MBQS for a set time period;
determining the total energy relative to the problem Hamiltonian based on a quantum state of the MBQS in response to expiration of the set time period; and
providing the quantum state of the MBQS as a solution in response to the total energy relative to the problem Hamiltonian being within a defined range of the target total energy.

2. The method of claim 1, further comprising disabling the oscillating fields applied to the single qubit transverse field terms and/or to the transverse inter-qubit couplings in response to expiration of the set time period prior to determining the total energy relative to the problem Hamiltonian based on the quantum state of the MBQS.

3. The method of claim 2, further comprising measuring the quantum state of the MBQS after disabling the oscillating fields.

4. The method of claim 2, wherein disabling the oscillating fields applied to the single qubit transverse field terms and/or to the transverse inter-qubit couplings in response to expiration of the set time period include ramping the disabling the oscillating fields applied to the transverse inter-qubit couplings down to zero strength.

5. The method of claim 1, further comprising, prior to evolving the MBQS based on the updated problem Hamiltonian, initializing the MBQS by coupling the plurality of qubits to oscillators to provide the oscillating fields applied to the single qubit transverse field terms and/or to the transverse inter-qubit couplings.

6. The method of claim 1, further comprising, in response to the total energy relative to the problem Hamiltonian being outside of the defined range of the target total energy:
evolving the MBQS based on the updated problem Hamiltonian by applying the oscillating fields to the single qubit transverse field terms and/or to the transverse inter-qubit couplings of the MBQS for a second set time period;
determining a second total energy relative to the problem Hamiltonian based on a second quantum state of the MBQS in response to expiration of the second set time period; and
providing the second quantum state of the MBQS as a solution in response to the second total energy relative to the problem Hamiltonian being within the defined range of the target total energy.

7. The method of claim 1, wherein applying oscillations to the single qubit transverse field terms and/or to the transverse inter-qubit couplings of the MBQS for a set time period includes driving the qubits with the oscillating fields according to the driver Hamiltonian so that each of the oscillating fields drives one of the qubits.

8. The method of claim 1, further comprising determining the plurality of qubit interaction constraint coefficients based on the binary optimization problem.

9. The method of claim 1, further comprising assigning each of the oscillating fields a common amplitude and a selected frequency and sign.

10. The method of claim 9, further comprising assigning a randomly-chosen frequency selected from a range of frequencies to the oscillating fields.

11. The method of claim 10, wherein the range of frequencies is determined based on the problem Hamiltonian.

12. The method of claim 9, further comprising assigning a first frequency to a first oscillating field of the oscillating fields and assigning a second frequency for a second oscillating field of the oscillating fields.

13. The method of claim 9, further comprising assigning a first frequency to a first group of the oscillating fields and assigning a second frequency to a second group of the oscillating fields.

14. The method of claim 1, wherein qubits of the MBQS each include a flux qubit having a loop of superconducting wire interrupted by a superconducting quantum interference device (SQUID).

15. The method of claim 14, wherein applying oscillating fields to the single qubit transverse field terms and/or to the transverse inter-qubit couplings of the MBQS for a set time period includes driving the qubits transversely to a quantization axis, and includes threading an oscillating magnetic flux of each of the oscillating fields through the SQUID of a corresponding flux qubit.

16. The method of claim 1, wherein qubits of the MBQS each include a flux qubit having a loop of superconducting wire interrupted by a superconducting quantum interference device (SQUID).

17. The method of claim 16, wherein applying oscillating fields to the single qubit transverse field terms and/or to the transverse inter-qubit couplings of the MBQS for a set time period includes driving the qubits transversely to a quantization axis by coupling an oscillating voltage across the SQUID of a corresponding flux qubit.

18. The method of claim 1, wherein evolving the MBQS further includes cooling the MBQS using lossy elements of the MBQS coupled to a subset of the qubits.

19. The method of claim 1, further comprising causing the single qubit transverse field terms and coupling terms of the problem Hamiltonian to experience oscillatory rotations around a common set of axes.

* * * * *